United States Patent
Eppolito

(10) Patent No.: US 8,862,254 B2
(45) Date of Patent: Oct. 14, 2014

(54) BACKGROUND AUDIO PROCESSING

(75) Inventor: Aaron Eppolito, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 780 days.

(21) Appl. No.: 13/006,317

(22) Filed: Jan. 13, 2011

(65) Prior Publication Data

US 2012/0185068 A1  Jul. 19, 2012

(51) Int. Cl.
| | | |
|---|---|---|
| *G06F 17/00* | (2006.01) | |
| *H04B 15/00* | (2006.01) | |
| *G11B 27/034* | (2006.01) | |

(52) U.S. Cl.
CPC .................................. *G11B 27/034* (2013.01)
USPC ............................................ 700/94; 381/94.1

(58) Field of Classification Search
CPC .. G11B 27/034; G10L 19/012; G10L 19/083; G10L 25/78; G10L 2021/02168; G10L 2025/783; H03B 29/00; H03G 5/005
USPC ........... 381/71.1, 73.1, 93, 94.1–94.9, 57, 56; 700/94

See application file for complete search history.

(56) References Cited

U.S. PATENT DOCUMENTS

| | | | |
|---|---|---|---|
| 5,657,422 A * | 8/1997 | Janiszewski et al. .......... 704/229 |
| 5,883,804 A | 3/1999 | Christensen | |
| 6,134,522 A | 10/2000 | Leckschat | |
| 6,150,598 A | 11/2000 | Suzuki et al. | |
| 6,184,937 B1 | 2/2001 | Williams et al. | |
| 6,337,947 B1 | 1/2002 | Porter et al. | |
| 6,392,135 B1 | 5/2002 | Kitayama | |
| 6,674,955 B2 | 1/2004 | Matsui et al. | |
| 6,881,888 B2 | 4/2005 | Akazawa et al. | |
| 6,967,599 B2 | 11/2005 | Choi et al. | |
| 7,003,083 B2 | 2/2006 | Kovales et al. | |
| 7,072,477 B1 | 7/2006 | Kincaid | |
| 7,206,986 B2 | 4/2007 | Stemerdink et al. | |
| 7,225,405 B1 | 5/2007 | Barrus et al. | |
| 7,383,509 B2 | 6/2008 | Foote et al. | |
| 7,548,791 B1 | 6/2009 | Johnston | |
| 7,653,550 B2 | 1/2010 | Schulz | |
| 7,756,281 B2 | 7/2010 | Goldstein et al. | |
| 7,769,189 B2 | 8/2010 | Moulios et al. | |
| 7,870,589 B2 | 1/2011 | Ducheneaut et al. | |
| 7,945,142 B2 | 5/2011 | Finkelstein et al. | |
| 8,006,195 B1 | 8/2011 | Woodings et al. | |
| 2002/0023103 A1 | 2/2002 | Gagne | |
| 2002/0034144 A1 | 3/2002 | Kotani | |
| 2002/0138795 A1 | 9/2002 | Wang | |
| 2002/0143545 A1 | 10/2002 | Tamura et al. | |
| 2003/0125910 A1 * | 7/2003 | Randmaa et al. .............. 702/191 |

(Continued)

OTHER PUBLICATIONS

Author Unknown, "Using Adobe Premiere Elements 8 Editor," last updated Aug. 12, 2010, 313 pages, Adobe Systems Incorporated, San Jose, CA, USA.

(Continued)

*Primary Examiner* — Fan Tsang
*Assistant Examiner* — Eugene Zhao
(74) *Attorney, Agent, or Firm* — Blakely, Sokoloff, Taylor & Zafman LLP

(57) ABSTRACT

Some embodiments provide a media-editing application for identifying a set of background audio segments of a composite presentation, generating additional background audio segments based on several identified background audio segments, detecting regions of the composite presentation that lack background audio, and inserting generated background audio into the detected regions of the composite presentation.

20 Claims, 24 Drawing Sheets

(56) References Cited

U.S. PATENT DOCUMENTS

| | | |
|---|---|---|
| 2004/0122662 A1 | 6/2004 | Crockett |
| 2004/0151469 A1 | 8/2004 | Engholm et al. |
| 2004/0199395 A1 | 10/2004 | Schulz |
| 2004/0264714 A1 | 12/2004 | Lu et al. |
| 2005/0042591 A1 | 2/2005 | Bloom et al. |
| 2005/0273321 A1 | 12/2005 | Choi |
| 2006/0020449 A1* | 1/2006 | Wong et al. .............. 704/215 |
| 2006/0156374 A1 | 7/2006 | Hu et al. |
| 2007/0121966 A1 | 5/2007 | Plastina et al. |
| 2007/0287490 A1 | 12/2007 | Green et al. |
| 2007/0292106 A1 | 12/2007 | Finkelstein et al. |
| 2008/0039964 A1 | 2/2008 | Charoenruengkit et al. |
| 2008/0256136 A1 | 10/2008 | Holland |
| 2009/0103752 A1 | 4/2009 | Chou et al. |
| 2009/0307199 A1 | 12/2009 | Goodwin |
| 2010/0189266 A1 | 7/2010 | Oh et al. |
| 2010/0199204 A1 | 8/2010 | Oh et al. |
| 2010/0303257 A1* | 12/2010 | Moulios et al. .......... 381/94.7 |
| 2011/0007915 A1 | 1/2011 | Park |

OTHER PUBLICATIONS

Author Unknown, "Adobe Premiere Pro CS3: User Guide," Apr. 1, 2008, 455 pages, Adobe Systems Incorporated, San Jose, CA, USA.

Author Unknown, "Frame-specific editing with Snap", Adobe Premiere Pro CS4 Classroom in a Book, Dec. 17, 2008, 17 pages, Adobe Press, USA.

Author Unknown, "PCM 81 Presets," Month Unknown, 1998, 8 pages, Lexicon Inc., Bedford, MA, USA.

Author Unknown, "Spectron—64-bit Spectral Effect Processor," Month Unknown, 2007, pp. 1-3, iZotope, Inc, Cambridge, MA, USA.

Author Unknown, "iMovie '08 Getting Started," Month Unknown, 2008, pp. 1-50, Apple Inc., USA.

Lee, Taejin, et al., "A Personalized Preset-based Audio System for Interactive Service," Audio Engineering Society (AES) $121^{st}$ Convention, Oct. 5-8, 2006, pp. 1-6, San Francisco, CA, USA.

Sauer, Jeff, "Review: Apple Final Cut Pro 4", Oct. 3, 2003, pp. 1-7, USA.

* cited by examiner

BACKGROUND AUDIO PROCESSING

BACKGROUND

Many of today's computing devices, such as desktop computers, personal computers, and mobile phones, allow users to perform audio processing on recorded audio or video clips. These computing devices may have audio and video editing applications (hereafter collectively referred to as media content editing applications or media-editing applications) that provide a wide variety of audio processing techniques, enabling media artists and other users with the necessary tools to manipulate the audio of an audio or video clip. Examples of such applications include Final Cut Pro® and iMovie®, both sold by Apple Inc. These applications give users the ability to piece together different audio or video clips to create a composite media presentation.

Many audio recordings used to make a composite media presentation will include ambient sound. Ambient sound is background noise that is constantly present at the location of an audio recording. As every location has sounds created by its environment, ambient sound present in an audio or video recording enables a listener to get a realistic sense of a particular scene in the recording. However, sometimes video will be recorded without sound or in a studio location that fails to duplicate the appropriate ambient sound. In such a case, the composite presentation may have an unnatural feel when viewed or heard.

BRIEF SUMMARY

For a media-editing application that creates composite media presentations from several media clips, some embodiments of the invention provide a method for automatically inserting background audio into portions of the composite media presentation. Some embodiments capture ambient sound, or background audio, from a portion of a media clip or from a portion of a sequence of media clips that is part of the composite media presentation. The media-editing application of some embodiments captures background audio based on an ambient noise level of the portion of the media clip(s). From the captured background audio, the media-editing application generates additional background audio using various audio generation techniques. The media-editing application detects regions in the composite media presentation that lack background audio and inserts appropriate background audio generated from the captured background audio into these regions.

Some embodiments of the media-editing application capture background audio by allowing a user of the media-editing application to identify a particular portion within a media clip in which the user wants to capture the background audio. The media-editing application then detects the ambient noise level in the particular portion (i.e., a maximum level for the background audio) and identifies periods within the particular portion in which the audio is within a threshold of the detected ambient noise level. In some embodiments, the media-editing application performs spectral analysis on the identified periods to verify that the identified periods only include background audio as opposed to non-background audio (e.g., low-volume speech content).

After capturing the background audio (obtaining a set of background audio segments from the audio clips of the composite media presentation), some embodiments of the media-editing application generate additional background audio by performing various audio processing techniques (e.g., concatenating, overlapping, reversing, scaling) on the set of background audio segments. Some embodiments also perform segment matching techniques that find captured background audio segments that are similar to each other (e.g., in terms of frequency spectrum, phase, etc.) in order to combine the similar segments together within the audio processing techniques. Performing audio processing (e.g., concatenating, overlapping, crossfading) on background audio segments that are similar to each other allows the media-editing application to generate background audio segments that are less abrupt and more continuous sounding. Moreover, some embodiments of the media-editing application perform assimilation techniques that try to make the captured background audio segments even more similar by adjusting the frequencies, phase, gain, intensity, etc. of the captured background audio segments. This further minimizes any abrupt changes that may appear between the various background audio segments when they are combined (e.g., concatenated, overlapped, etc.).

As mentioned, the media-editing application uses the generated background audio to add background audio to portions of the composite media presentation. The media-editing application of some embodiments detects regions within the composite media presentation to insert the background audio. These detected regions may be regions that lack background audio or need additional background audio. Some embodiments of the media-editing application detect regions within the composite media presentation in which the audio is below the detected ambient noise level. Oftentimes, these regions are the areas between individual clips that are part of the composite presentation or periods within the clips that are deemed as too quiet. In addition, some embodiments detect regions that have sound but lack background audio frequencies (e.g., speech, music, etc.). The media-editing application then inserts background audio into these detected regions of the composite media presentation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

For a media-editing application that creates composite media presentations (also called composite presentations) from several media clips, some embodiments of the invention provide a method for automatically inserting background audio into portions of the composite presentation. The composite presentation may be a single media clip or a sequence of media clips arranged (e.g., by a user of the media-editing application) together along a timeline.

A media clip contains media content that is stored on a computing device on which the media-editing application executes, or on a computing device to which the media-editing application has access. Examples of such content include audio data, video data, text data, pictures, and/or other media data. Accordingly, media clips are any kind of content clip (audio clip, video clip, picture clip, or other media clip) that can be used to create a composite presentation.

Some embodiments capture ambient sound, or background audio, from a portion of a media clip or from a portion of a sequence of media clips that is part of the composite media presentation. The media-editing application of some embodiments captures background audio based on an ambient noise level of the portion of the media clip(s). From the captured background audio, the media-editing application generates additional background audio using various audio generation techniques. The media-editing application detects regions in the composite media presentation that lack background audio and inserts appropriate background audio generated from the captured background audio into these regions.

The background audio of a portion of a composite presentation is generally an ongoing, low-volume noise that is separate from the particular sounds that are the intended audio content of the portion of the composite presentation. Background audio generally does not have a recognizable repetitive pattern, and will sometimes fall into the category of white noise. Examples of typical noise that the media-editing application will detect as background audio include a low-frequency laptop fan, crickets chirping, cars passing by, tape hiss, etc.

Figure 1:
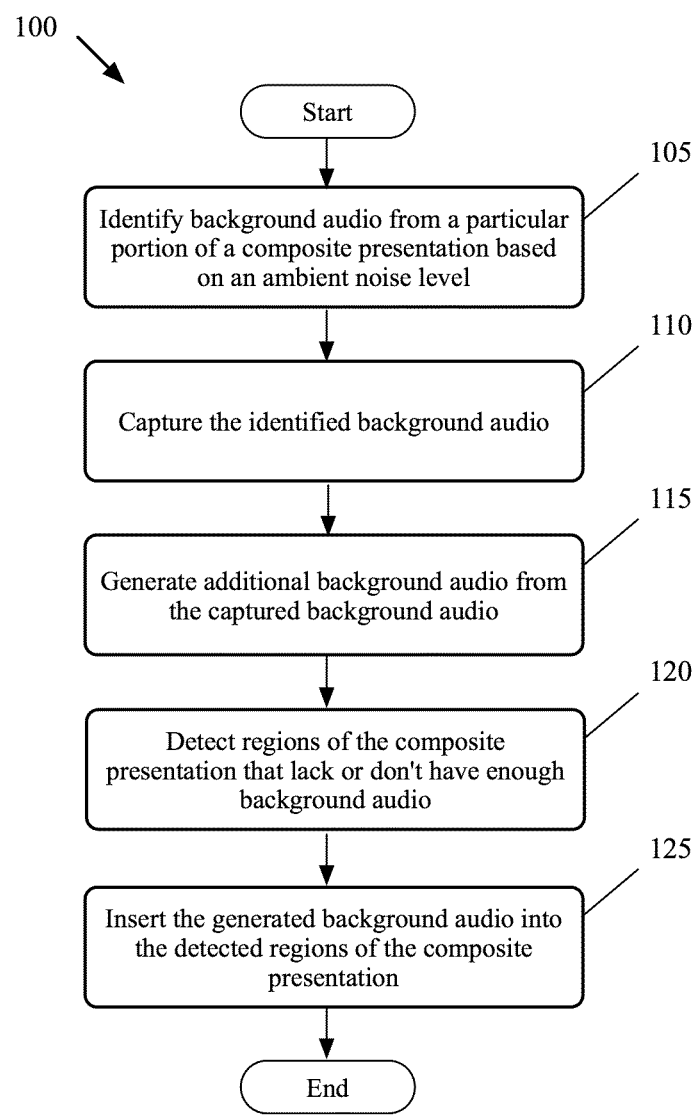
FIG. 1 conceptually illustrates a process that some embodiments of a media-editing application perform on a composite presentation to insert background audio into the composite presentation.

FIG. 1 conceptually illustrates a process 100 of some embodiments performed by a media-editing application to insert background audio into a composite presentation. The process 100 will be described by reference to FIG. 2, which illustrates an example of the capture of background audio from a portion of a composite presentation, generation of additional background audio, and insertion of the generated background audio into the composite presentation in four stages 205-220.

As shown in FIG. 1, the process 100 begins by identifying (at 105) background audio from a particular portion (e.g., a particular clip) of a composite presentation based on an ambient noise level of the portion. As mentioned above, the composite presentation may include a single media clip or multiple media clips. In some embodiments, a user of the media-editing application selects the particular portion of the composite presentation from which the application identifies the background audio. The user may select a particular portion because the portion has background audio that the user wants to insert into other portions of the composite presentation. In other embodiments, the media-editing application selects the particular portion from which to identify background audio based on a set of criteria.

As mentioned, the media-editing application identifies background audio from a portion of the composite presentation based on an ambient noise level of the portion. The media-editing application of some embodiments detects the ambient noise level of the selected portion by finding the minimum volume level (or minimum amplitude of the sound waveform) within the selected portion that is maintained for a particular length of time or number of periods. Section I below further describes details on the identification of the background audio based on the ambient noise level.

Figure 2:
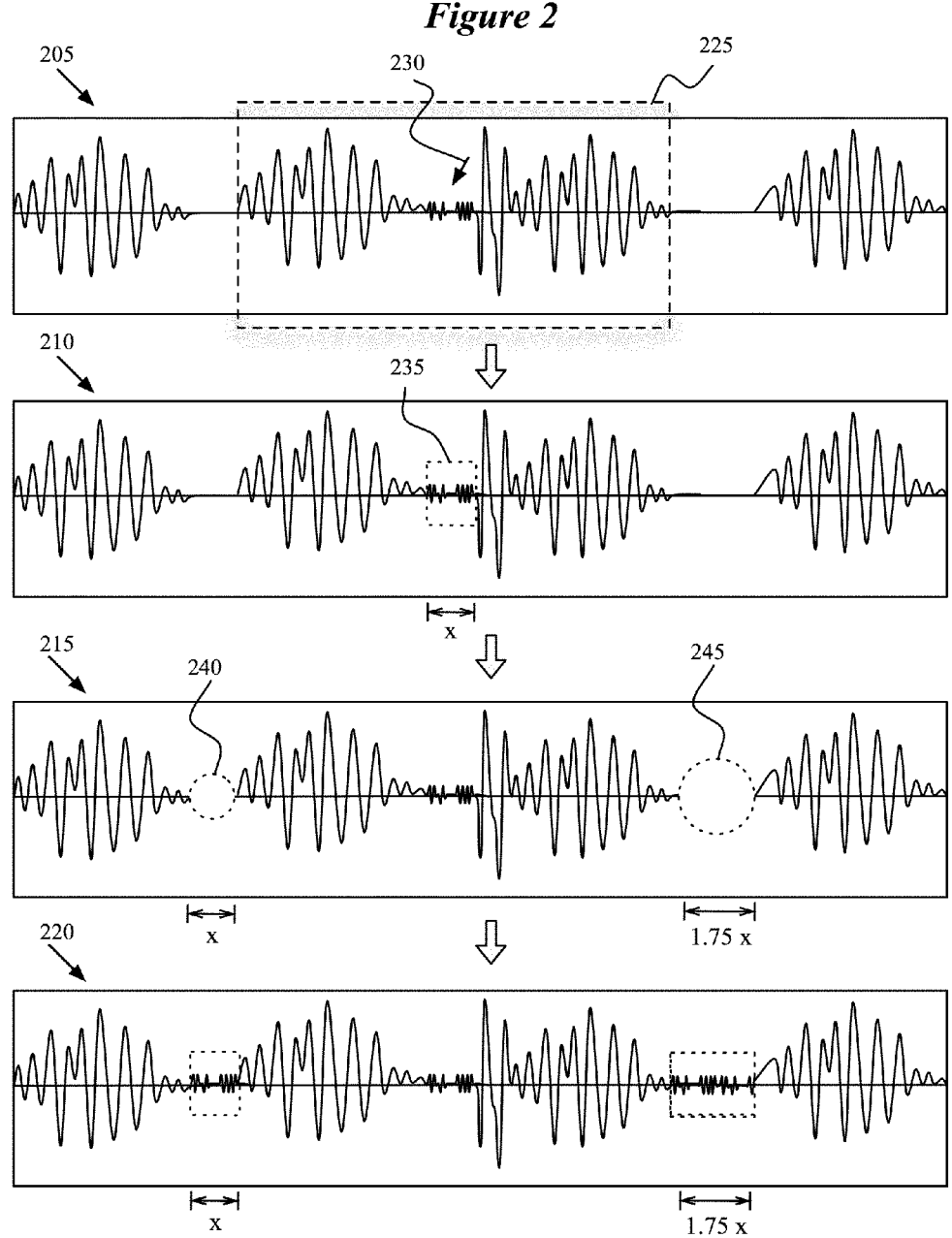
FIG. 2 illustrates an example of the capture of background audio from a portion of a composite presentation, generation of additional background audio, and insertion of the generated background audio in the composite presentation.

The first stage 205 of FIG. 2 illustrates a generated waveform that represents the audio data of a composite presentation. This generated waveform view graphically displays the audio data's amplitude over time. Here, the user has selected a particular portion 225 of the composite presentation from which he wants to retrieve background audio. As shown in the first stage 205, the arrow 230 points to a section of the composite presentation in which the minimum amplitude found in the particular portion 225 is sustained. The ambient noise level of this portion is the maximum amplitude within this section of sustained low-amplitude sound.

The second stage 210 of FIG. 2 illustrates the identification of background audio 235. As illustrated, this background audio 235 does not include all of the low-amplitude audio from the section 230. Some embodiments filter out portions of the audio data that fit certain characteristics indicative of non-background audio. For instance, some embodiments use spectral analysis to determine that the identified low-amplitude audio does not contain certain spectral characteristics associated with non-background audio (e.g., harmonics, similar frequencies as surrounding higher-amplitude audio).

Next, the process 100 captures (at 110) the identified background audio. The media-editing application may capture the identified background audio by extracting the data of the identified background audio and storing the audio data in a data storage. Some embodiments create a new audio file for the captured background audio, while other embodiments store a reference (e.g., a pointer) to the original source audio. The media-editing application of some embodiments may store this data in a data storage that is easily accessible (e.g., RAM or a persistent data storage) for further processing. As described above, the captured portion can be stored in a temporary data storage that is easily accessible for later retrieval and further processing. As shown in this example, the captured portion has a length x.

The process 100 generates (at 115) additional background audio from the captured background audio. The user may want the media-editing application to generate additional background audio so as to recreate a particular setting that appears realistic (i.e., without background audio sounding repetitive or unnatural) when the background audio is inserted. For instance, the user may want the media-editing application to retrieve background audio of a train passing by on nearby tracks and insert this background audio into another portion of the composite presentation to indicate that a setting of a particular scene is near the train tracks. Generating additional background audio to create variations in the captured background audio enables the particular scene to appear more natural when the background audio is inserted into the composite presentation.

Some embodiments generate additional background audio from a set of captured background audio segments by performing various audio processing techniques (e.g., concatenating, overlapping, reversing, scaling) on the set of background audio segments. Some embodiments also perform segment matching techniques that find captured background audio segments that are similar to each other (e.g., in terms of frequency spectrum, phase, etc.) in order to combine the similar segments together within the audio processing techniques. Performing audio processing (e.g., concatenating, overlapping, crossfading) on background audio segments that are similar to each other allows the media-editing application to generate background audio segments that are less abrupt and more continuous sounding. Moreover, some embodiments of the media-editing application perform assimilation techniques that try to make the captured background audio segments even more similar by adjusting the frequency components, phase, gain, intensity, etc. of the captured background audio segments. This further minimizes any abrupt changes that may appear between the various background audio segments when they are combined (e.g., concatenated, overlapped, etc.).

The process 100 then detects (at 120) regions of the composite presentation without sufficient background audio. The various detected regions can be within the clip from which the background audio was identified, within different clip(s) from which the background audio was identified, or between clips. Some embodiments of the media-editing application detect regions within the composite media presentation in which the audio is below the detected ambient noise level. Oftentimes, these regions are the areas between individual clips that are part of the composite presentation or periods within the clips that are deemed as too quiet. The detected regions in some embodiments are regions that have non-background audio (e.g., speech content) but lack background audio. These regions may be detected by performing spectral analysis on the composite presentation.

The third stage 215 of FIG. 2 illustrates detection of regions within the composite presentation that lack background audio (in this case, regions that lack any audio). In this example, the media-editing application automatically detected two regions 240 and 245 within the composite presentation that have an amplitude below the detected ambient noise level (from the first stage 205). As shown here, the duration of the detected regions may be of variable length—in this case, x and 1.75x.

The process 100 inserts (at 125) generated background audio into the detected regions of the composite presentation. Some embodiments perform further processing (e.g., crossfading at the edges, level matching with the signal before and after the identified portion, length adjustment) on the generated background audio before inserting the generated audio into the detected regions. Performing some further processing before insertion enables the media-editing application to ensure continuity and minimize abrupt changes that may appear during insertion. On the other hand, some embodiments do not perform any additional processing and insert the generated background audio as is.

The last stage 220 of FIG. 2 illustrates insertion of the generated background audio into the regions detected at the third stage 215. In this example, the media-editing application adjusted the duration of the generated background audio to appropriately fit the detected regions. As shown, the quietest portions of the composite presentation now contain background audio.

FIGS. 1 and 2 illustrate an example process in which background audio is captured, modified, and then inserted into regions of a composite presentation. Several more detailed embodiments are described below. Section I describes identification of background audio from a particular portion of a composite presentation based on an ambient noise level. Next, Section II describes generation of additional background audio from the identified background audio. Section III describes detection of regions of the composite presentation in need of background audio and the insertion of the generated background audio into these regions. Section IV then describes the software architecture of a media-editing application of some embodiments. Finally, Section V describes an electronic system with which some embodiments of the invention are implemented.

I. Identification of Background Audio

As mentioned above, the media-editing application of some embodiments performs various background audio processing techniques on a set of media clips that form a composite media presentation. Some embodiments identify background audio from a particular portion of the composite presentation. The media-editing application may automatically identify the background audio (e.g., using processes described in this section) in some embodiments. Alternatively, or conjunctively, some embodiments enable a user of the media-editing application to identify the background audio (e.g., by selecting segments of the composite presentation). After identifying the background audio, the media-editing application of some embodiments extracts the background audio for further processing in order to generate new audio for insertion into other parts of composite presentation.

Figure 3:
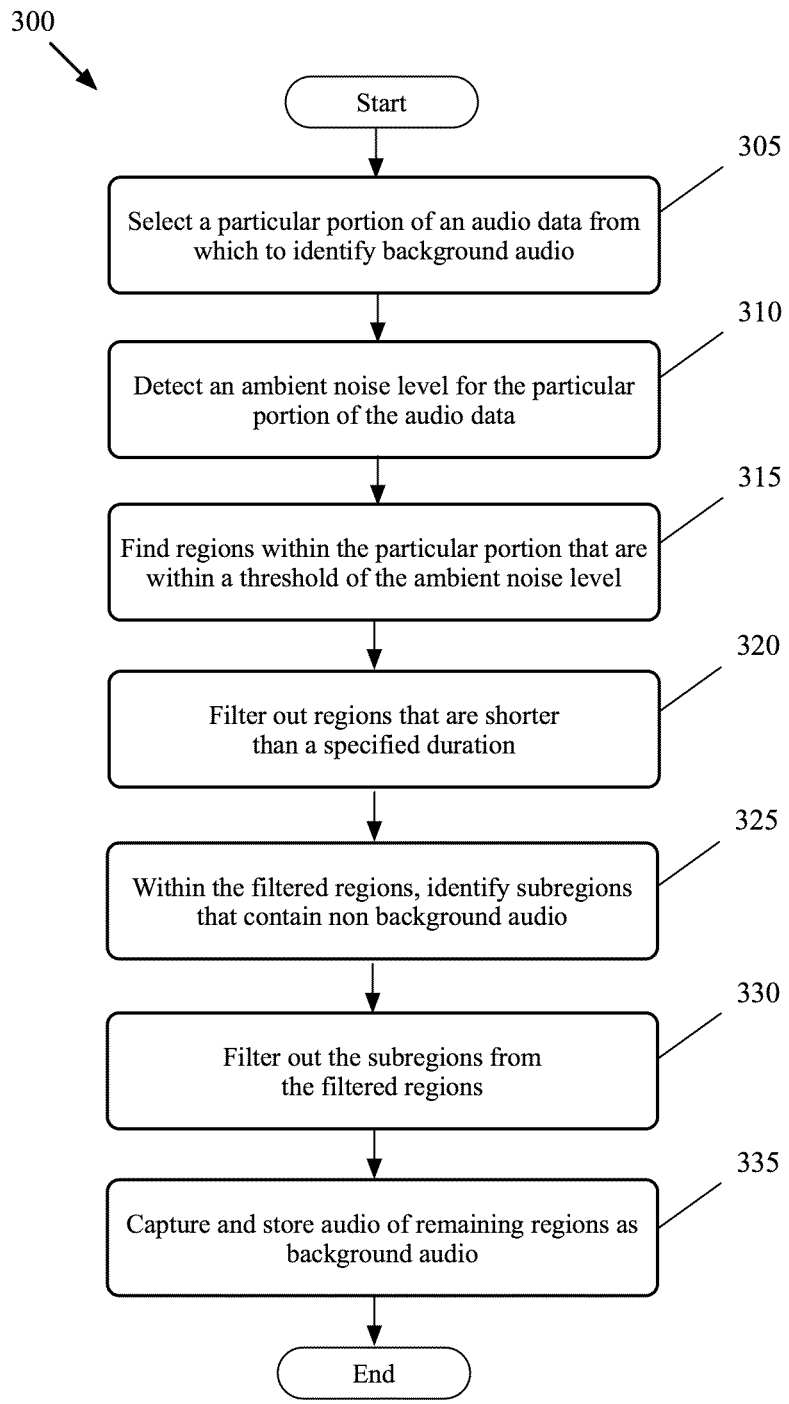
FIG. 3 conceptually illustrates a process of some embodiments for identifying and capturing background audio from a particular portion of a sequence of audio data.

FIG. 3 conceptually illustrates a process 300 of some embodiments for identifying and capturing background audio from a particular portion of a sequence of audio data. In some embodiments, the sequence of audio data is a composite presentation of one or more media clips (e.g., audio clips, video clips with audio, etc.). Some embodiments perform the process 300 at operations 105 and 110 of process 100. The process 300 will be described by reference to FIGS. 4-7.

Figure 4:
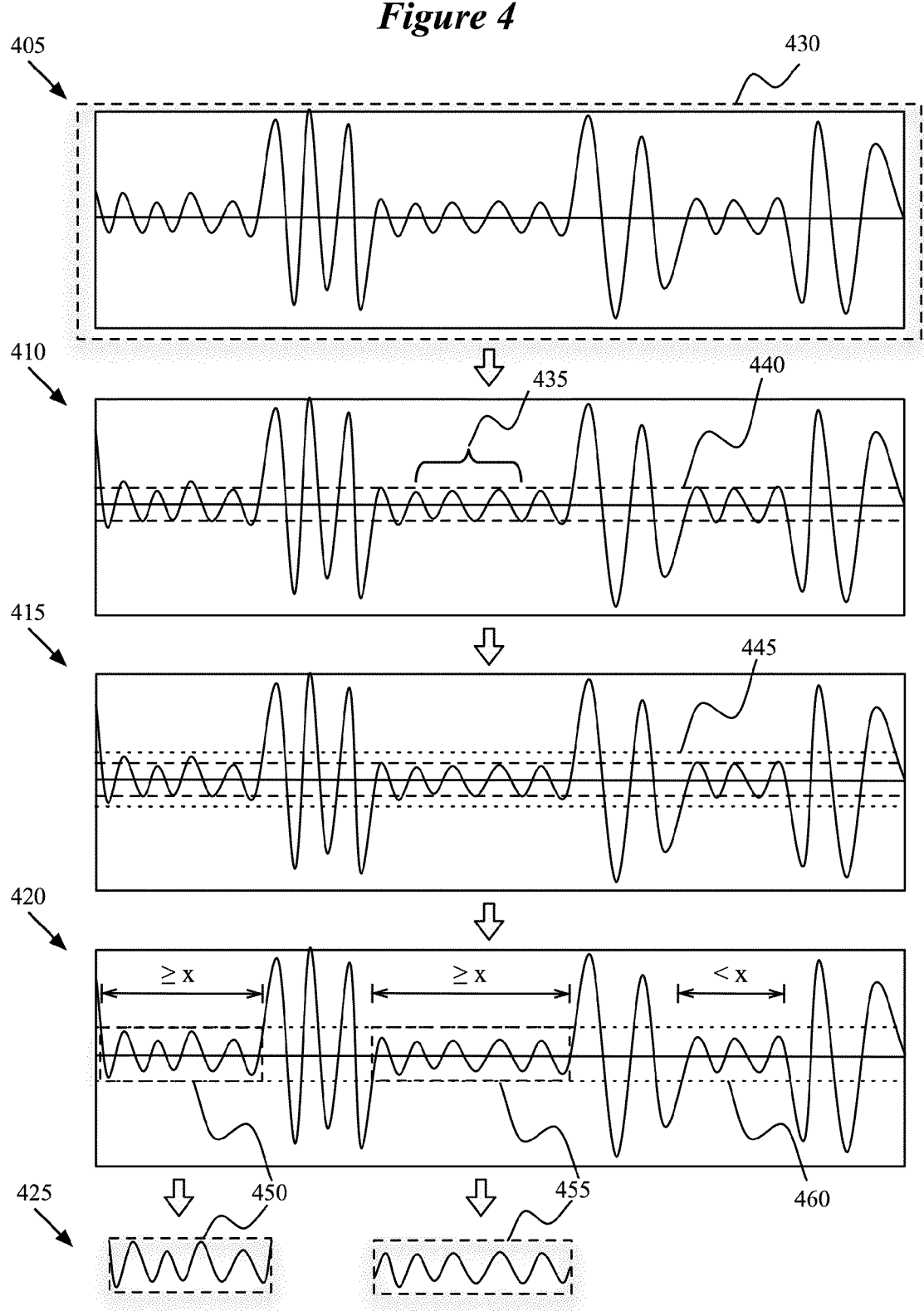
FIG. 4 illustrates an example of extracting the background audio from a composite presentation according to some embodiments.
Figure 5:
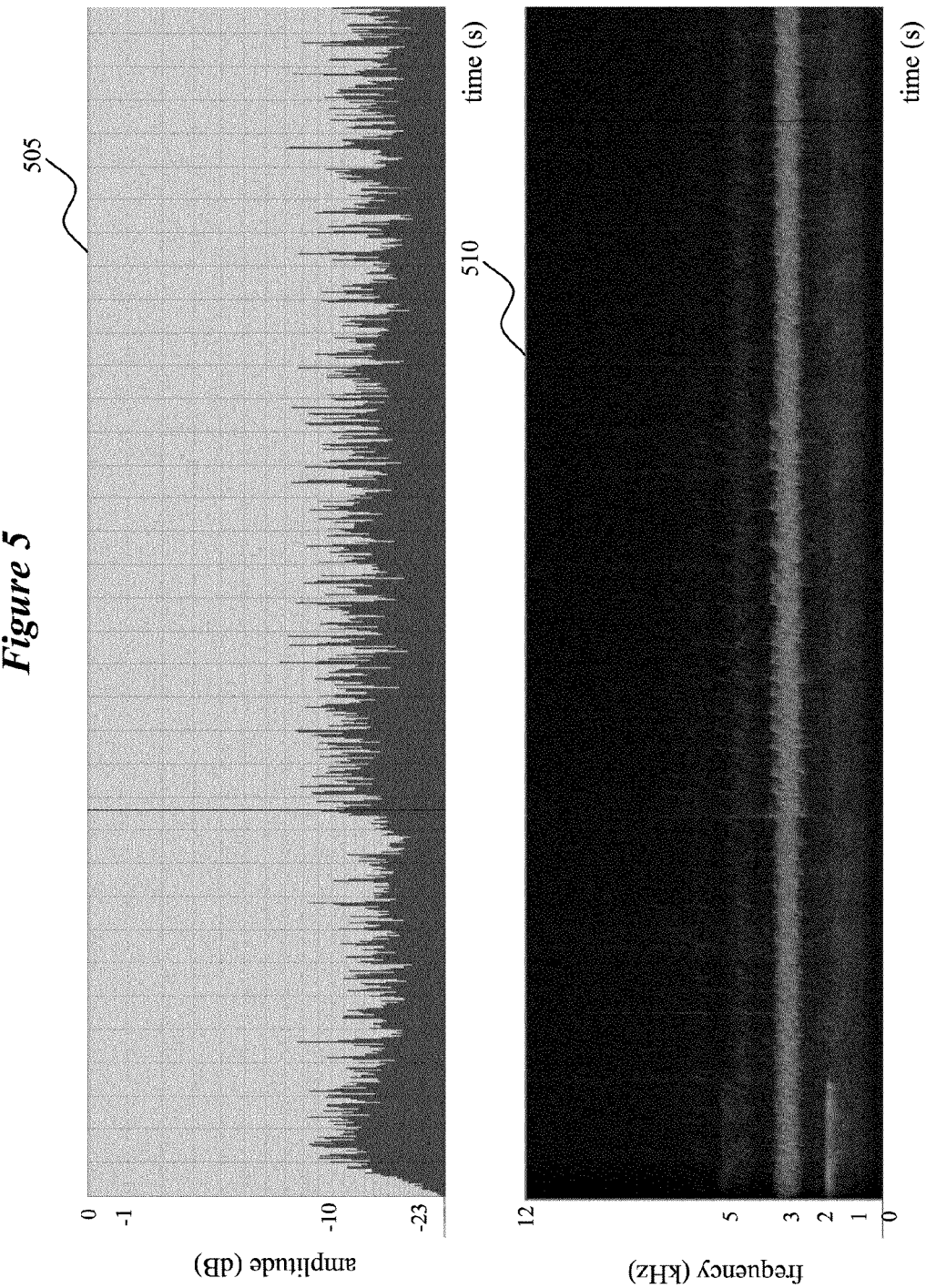
FIG. 5 illustrates an example of background audio in waveform view and its corresponding frequency spectrum view.
Figure 6:
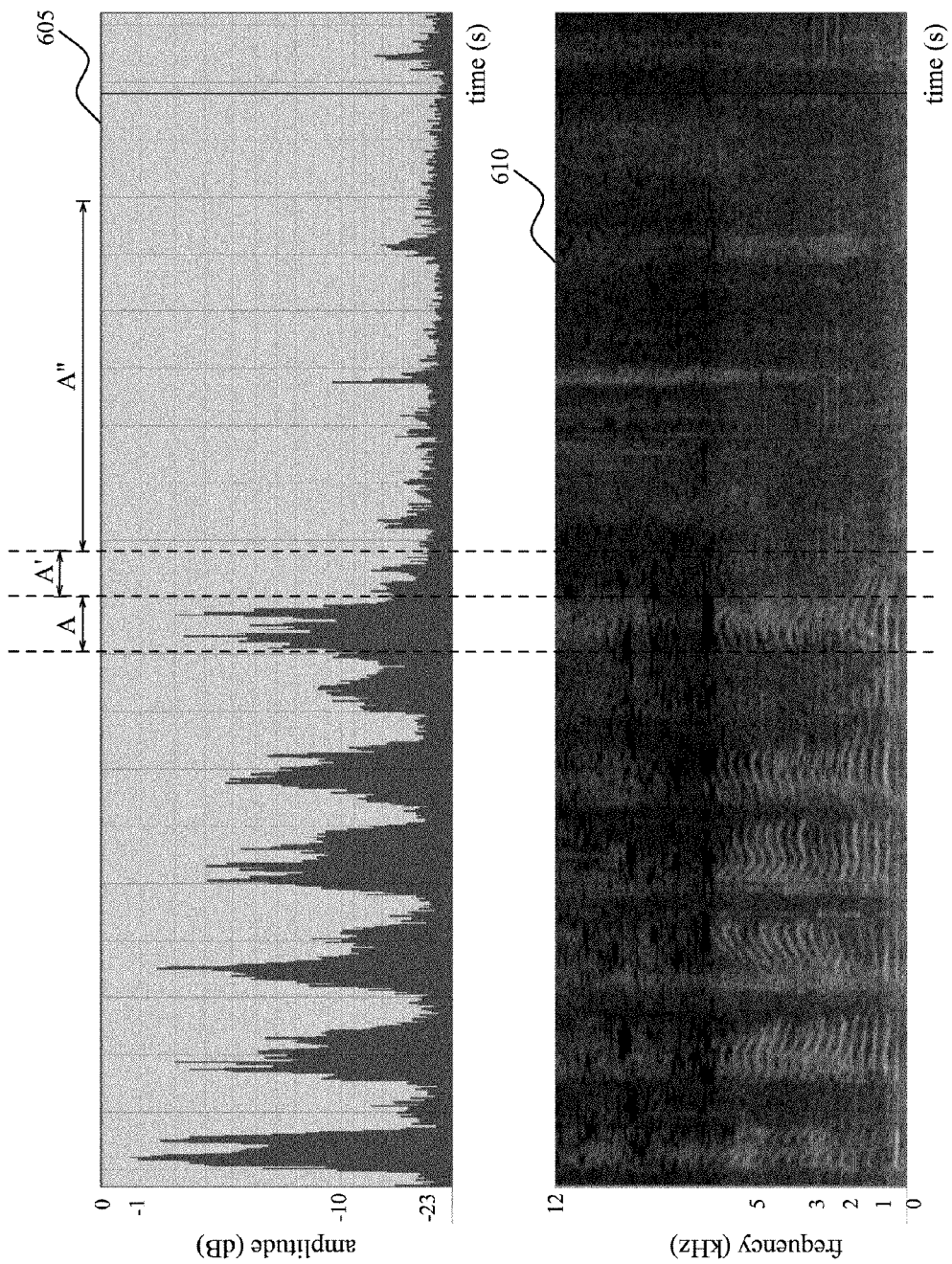
FIG. 6 conceptually illustrates performing spectral analysis on a region within the composite presentation to avoid capturing a tail-end non-background audio that is at a low volume.
Figure 7:
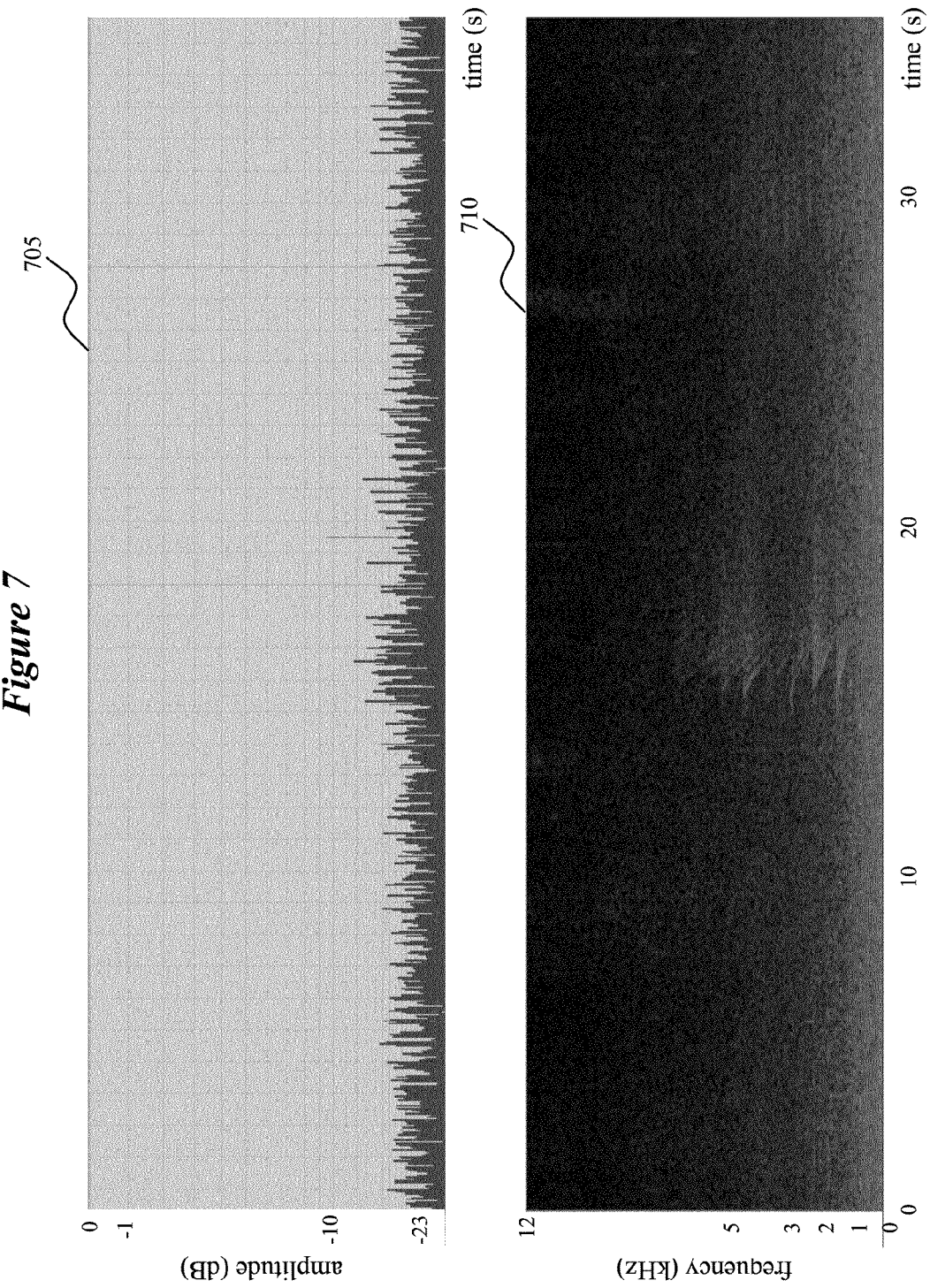
FIG. 7 conceptually illustrates performing spectral analysis on the composite presentation to avoid capturing non-background audio with a similar volume as surrounding background audio.

FIG. 4 illustrates an example of extracting the background audio from a composite presentation according to some embodiments, in five stages 405-425. FIGS. 5-7 illustrate examples of distinguishing non-background audio from background audio in a composite presentation by performing spectral analysis of the audio data's frequencies to ensure that the media-editing application only captures background audio.

As shown in FIG. 3, the process 300 begins by selecting (at 305) a particular portion of the sequence of audio data from which to identify background audio. The media-editing application allows a user of the application to select this particular portion in some embodiments. In other embodiments, the media-editing application automatically selects the particular portion of the audio data from which background audio is then identified.

In some embodiments, the particular portion is the entire sequence of audio data (e.g., an entire composite presentation of audio clips). However, the portion may also be less than the entire sequence (e.g., a single clip, a subset of the clips, a portion of a clip, or portions of multiple clips). A user (or the media-editing application in the case of automated selection of the portion) may select a particular portion for a variety of reasons. For instance, if the sequence of audio data includes scenes recorded at various locations, the user of the media-editing application may want to capture the background audio from only a particular one of the locations. Moreover, if the background audio from one location changes (e.g., birds chirping in the first five minutes changing into raindrop sounds without birds chirping in the next five minutes), then the user may want to select only one of these portions (e.g., a particular time interval) in order to isolate a particular type of background audio.

The first stage 405 of FIG. 4 illustrates a selected portion of a sequence of audio data from which a media-editing application can detect background audio for the sequence. As mentioned above, this portion may be selected either by a user of the media-editing application or by the media-editing application in an automated manner. In this example, the selected portion is indicated by the dotted lines 430 (the rest of the sequence of audio data is not shown in this figure). In some embodiments, the selection can be made by a user indicating start and end points in a waveform view of the audio data displayed in the media-editing application. In this example, the selected portion is a single audio clip.

Next, the process 300 detects (at 310) an ambient noise level for the particular portion of the audio data. In some embodiments, the media-editing application detects the ambient noise level by identifying the lowest sustained amplitude of the selected portion of the audio data. To find the lowest sustained amplitude, the media-editing application of some embodiments identifies the minimum root mean square (RMS) power value of the selected portion of the audio data signal for a threshold duration. Different embodiments, however, may use other techniques to identify the ambient noise level for a given portion of audio data.

The second stage 410 of FIG. 4 illustrates the identification of the ambient noise level of the audio data in portion 430. In this example, the media-editing application designates the minimum sustained amplitude as the ambient noise level. The bracketed section 435 is the section of portion 430 with at least a threshold minimum duration having the minimum RMS power value for the portion. The ambient noise level is determined in this example as the maximum amplitude in this section 435 and is indicated by the dotted lines 440. As described above, different embodiments may use different techniques to identify the ambient noise level.

The process 300 finds (at 315) regions within the particular portion that are within a threshold of the amplitude of the ambient noise level. In some embodiments, the background audio is not always at the same ambient noise level, but might have amplitudes slightly above the ambient noise level. The threshold can be designated by a user of the media-editing application or determined by the media-editing application itself (e.g., as a particular percentage of the amplitude of the ambient noise level or as a fixed quantity).

The third stage 415 of FIG. 4 illustrates a threshold level above the ambient noise level, indicated by dotted lines 445. In this case, the threshold is slightly higher than the amplitude of the ambient noise level. This threshold encompasses a number of peaks of the waveform that are slightly above the ambient noise level.

The fourth stage 420 of FIG. 4 illustrates identified regions in the portion 430 of audio data that are below the background audio threshold. In this example, the portion of audio data contains three regions 450, 455, and 460 the amplitudes of which stay below the specified background audio threshold (indicated by dotted lines 445).

After identifying the regions of potential background audio, the process 300 then filters out (at 320) regions that are shorter than a specified duration. The media-editing application will not capture audio segments that are shorter than a certain duration in some embodiments because very short low-volume audio segments are less likely to be useful background audio (e.g., such segments may be non-background noise, or may not include enough background noise to be useful in additional processing). Some embodiments allow a user of the media-editing application to determine the minimum duration, while in other embodiments this setting is a non-modifiable property of the application.

As shown in FIG. 4, only two of the three regions 450-460 are at least the requisite duration in length. In this example, the required duration is a length x in time, and the duration of region 460 is less than this length. However, both regions 450 and 455 have lengths greater than the required duration.

Next, the process 300 identifies (at 325) subregions within the filtered regions that contain non-background audio. Some embodiments of the media-editing application identify subregions within the filtered regions that contain non-background audio to ensure that non-background audio is not captured as part of the background audio. Different embodiments use different techniques to distinguish non-background audio from background audio. Some embodiments discard a portion in the beginning of a filtered region when the region includes the low-volume tail-end of non-background audio. In addition, some embodiments identify low-volume non-background audio, such as harmonics, within the filtered regions. Some embodiments identify this non-background audio by performing spectral analysis to identify the frequencies of the audio within the filtered regions. FIGS. 5-7 illustrate different examples of distinguishing non-background audio from background audio using spectral analysis of audio data.

FIG. 5 illustrates an example of background audio in waveform view and its corresponding frequency spectrum view. As mentioned above, the waveform view graphically displays the audio's amplitude over time. The waveform view allows a user to see a sound clip's amplitude, but provides little about its frequency content. The frequency spectrum view displays a visual representation of the frequency content of the audio data. The frequency spectrum view enables a user of the media-editing application to observe spectral characteristics of audio data that cannot be observed easily by viewing a waveform. For example, in the frequency spectrum view or sound spectrogram, voicing or speech content is represented on the spectrogram by harmonics, or by displaying many frequencies ranging from the fundamental all the way up to infinity, in principle, in integral multiples. Background audio, or background noise, however, is random energy as opposed to harmonically organized energy and therefore often appears as being "snowy" in spectrograms. The energy is placed in frequency and amplitude more randomly rather than being organized neatly into clear bands.

As described above, background audio typically has a fairly low and steady volume. In this example clip 505, the background audio captured here is background noise from an evening in the marshlands. The vertical axis of this waveform diagram represents amplitude in decibels (dB) and the horizontal axis represents time over an interval of a few seconds. Because the background audio here has a fairly constant loudness in this example, the amplitude stays at approximately the same level.

The example clip 510 illustrates the corresponding frequency spectrum view of the same background audio. The frequency spectrum view of audio data can be obtained by measuring the amplitudes of the components of a complex waveform throughout the frequency range of the waveform in some embodiments. As shown in this example 510, the audio signal is measured over a frequency range (e.g., 0~12 kHz). The vertical axis represents frequency linearly extending from 0 to 12 kHz, and the horizontal axis represents time over an interval of a few seconds. As shown, the background audio in frequency spectrum view appears as "snowy" around certain frequencies (e.g., 2 kHz, 3 kHz, and 5 kHz). The "snowiness" around 3 kHz is particularly visible as the continual drone of crickets in the marshlands chirp at approximately this frequency. The background audio here has a fairly low frequency range (e.g., 1 to 5 kHz) as shown by this spectrogram.

FIG. 6 conceptually illustrates performing spectral analysis on a region within the composite presentation to avoid capturing a tail-end non-background audio that is at a low volume. The media-editing application of some embodiments may accidentally capture the tail-end of non-background audio that is at a low volume (e.g., when a person's voice trails off towards the end of a sentence) as part of background audio when using a background audio identification technique such as that described above. Some embodiments of the media-editing application discard a beginning portion (e.g., ½ second, 1 second) of the audio to avoid accidentally capturing the tail-end of non-background audio as part of a background audio segment.

In some embodiments, the media-editing application may perform spectral analysis on the audio content to distinguish non-background audio from background audio. Spectral analysis includes observing the spectral characteristics of the audio content. Some embodiments distinguish whether the start of a background audio segment has non-background audio by comparing the spectral characteristics of the start of the identified background audio segment to the spectral characteristics of the remaining portion of the background audio segment. Some embodiments may compare the spectral characteristics of the start of the background audio segment to the spectral characteristics of the portion before the background audio to distinguish non-background audio from background audio.

The example clip 605 is a graphical representation of the waveform view of a single audio clip that includes speech followed by background audio. The vertical axis of this waveform view represents amplitude in decibels (dB) and the horizontal axis represents time over an interval of a few seconds. The background audio here is a low frequency, constant and steady traffic noise of cars driving by in the background. Again, the vertical axis of this waveform diagram represents the amplitude in decibels and the horizontal axis represents time over an interval of a few seconds. As shown in this waveform 605, A indicates the part of the waveform where the person is speaking. A' indicates the captured audio content that could be the tail-end of non-background audio or part of the background audio. As mentioned above, some embodiments would initially classify the section A' as background audio. To avoid including the tail-end of non-background audio content in the captured background audio segment, some embodiments perform spectral analysis to determine whether the apparent start of a background audio section is actually the tail-end of non-background audio.

The example clip 610 is the corresponding frequency spectrum view of the same audio. The vertical axis represents frequency linearly extending from 0 to 12 kHz, and the horizontal axis represents time over an interval of a few seconds. The frequency spectrum view or sound spectrogram reveals individual harmonics (component frequencies) where speech is present. Since human speech contains harmonics and has many frequencies ranging from low to high, the media-editing application of some embodiments can distinguish portions of the composite presentation that contain background audio and non-background audio (e.g., speech content) by identifying the portions that have the distinctive pronounced harmonics (equally spaced horizontal lines).

The media-editing application of some embodiments compares the spectral characteristics of A' with the spectral characteristics of A" to determine whether A' is the tail-end of low frequency speech content or part of background audio. If the spectral characteristics of A' are similar to the spectral characteristics of A", then the media-editing application may include A' as part of the background audio. If they are not similar (or if the spectral characteristics of A' is more similar to the spectral characteristics of A, which has been identified as speech content), then the media-editing application removes A' from the background audio. There are various ways to compare the spectral characteristics of portions of a composite presentation (e.g., by determining whether different portions of the composite presentation contain harmonic content). Different embodiments may compare the spectral characteristics of different portions differently.

As shown in the frequency spectrum view 610, the portion corresponding to A contains visible harmonics as indicated by the multiple horizontal stripes running across that portion of the figure. The portion in the frequency spectrum view that corresponds to A' also contains some of these spectral characteristics as A' also reveals harmonic content, as indicated by the horizontal stripes in the lower frequencies, though the harmonics are not as pronounced throughout all frequencies. This indicates that A' is more likely the tail-end of non-background audio (in this case, someone's speech trailing off). Since the spectral components of A' are more similar to A (i.e., the portion containing speech) and include harmonic content, the media-editing application of some embodiments may remove the audio content of A' from the background audio to capture (i.e., A'+A") and simply retain A" as a background audio segment to avoid capturing non-background audio content as part of background audio.

FIG. 7 conceptually illustrates performing spectral analysis on the composite presentation to avoid capturing non-background audio with a similar volume as surrounding background audio. Here, the audio data captured contains background audio from a mall and a child yelling at a distance in the middle of the graphs, along with some very faint distant speech towards the end. By looking at the waveform view 705 of the audio data, a user of a media-editing application may not be able to distinguish non-background audio or speech content from background audio at a similar low-volume. The vertical axis of this waveform view represents amplitude in decibels (dB) and the horizontal axis represents time over an interval of a few seconds. However, as described above, speech content may be distinguishable from background audio in the spectrum view by comparing the spectral characteristics of different portions of the audio data (e.g., observing whether there is harmonic content present in certain portions).

As shown in the waveform view 705 of this audio data, the amplitude is fairly constant. By simply observing the waveform view of audio data, it is difficult for one to tell whether there is speech content amidst the background audio. The corresponding spectrum view 710 presents information (e.g., harmonic content) that cannot be easily observed by viewing the waveform view of the audio data. The vertical axis represents frequency linearly extending from 0 to 12 kHz, and the horizontal axis represents time over an interval of a few seconds. As shown, the spectrum view 710 shows that there is harmonic content present at approximately 16-20 seconds and 28-32 seconds. These non-background audio sections, although distant and faint to the human ear (no louder than the background audio), are content that should be excluded from the background audio segments. The media-editing application of some embodiments may then remove these portions of the audio content that contain harmonic content from the background audio.

Returning to FIG. 3, the process 300 filters out (at 330) the subregions from the filtered regions. The subregions identified as non-background audio at 325 are removed so as to leave only background audio remaining. In some embodiments, if the subregion identified as non-background audio is in the middle of a region, then the media-editing application discards the entire region. Some embodiments, instead of discarding the entire region, assess whether the remaining portions are at least a specific duration long (e.g., the duration used at operation 320). When the remaining portions are of a certain duration long, then the media-editing application of some embodiments keeps the remaining portions as background audio regions. If not, then the media-editing application may discard the remaining portions along with the non-background subregion. When the subregion identified as non-background audio is at the edge of a region, then the media-editing application discards only the non-background subregion and keeps the remaining portion of the region as background audio. In other embodiments, if the application detects any portion of a region as non-background audio, the media-editing application discards the entire region.

The process 300 then captures and stores (at 335) the audio of the remaining regions as background audio. Some embodiments store the audio data of the remaining regions in a storage buffer in order to use the audio data to generate new background audio. These background audio segments can then be easily retrieved for further processing, which is described in further detail below. Other embodiments store the background audio segments as new audio files in a permanent storage for later usage.

One of ordinary skill will recognize that some embodiments may not perform all the operations of process 300 in order to identify and capture the background audio. For instance, some embodiments may not filter out regions that are shorter than a specified duration. Similarly, some embodiments may perform more or less processing to identify and remove non-background audio from potential background audio segments.

II. Generation of Additional Background Audio

As mentioned above, the media-editing application of some embodiments captures background audio from a portion of a composite presentation in order to generate additional background audio that can be inserted into other portions of the composite presentation. This generation of additional background audio may use background audio segments captured automatically, as described above. Alternatively, or conjunctively, some embodiments allow a user to select background audio segments without the above analysis.

In some embodiments, the media-editing application generates additional background audio so as to recreate a particular setting that may be recognizable to a listener when the background audio is inserted. For instance, the user may want a listener to perceive that a dialogue takes place nearby a waterfall in a forest. Inserting generated background audio from captured background audio (e.g., including the sound of rushing water) enables a listener to think that the dialogue takes place in that particular setting. In addition, some embodiments use the insertion of background audio to give a more uniform sound to an entire composite presentation or a part of the composite presentation, or to make parts of the presentation sound more realistic.

The media-editing application of some embodiments performs various audio generation techniques on background audio captured from a composite presentation. Some embodiments capture the background audio segments using the processes described above in Section I, though other background audio capture processes are possible. The media-editing application of some embodiments performs audio processing techniques on the captured background audio in order to generate background audio that appears to be naturally part of the composite presentation when inserted. Some embodiments enable the user to select a set of audio processing techniques to use in generating background audio for a composite presentation, while other embodiments select the techniques (or always use a consistent set of settings).

The audio processing techniques used to generate the additional background audio may include concatenation operations, flip operations, overlap operations, crossfade operations, and/or additional processing operations that can be performed on captured background audio segments to assemble new background audio segments. To perform several of these operations, a media-editing application of some embodiments performs various matching techniques such as frequency spectrum matching, phase matching, and/or level matching on the captured background audio segments to identify background audio segments that have similar characteristics (e.g., in terms of frequency spectrum, phase, gain, intensity, etc.). Assembling background audio segments with such similar characteristics enables the assembled background audio segments to sound more continuous and natural.

Furthermore, some embodiments of the media-editing application perform assimilation techniques on the background audio segments before assembling the new segments. These assimilation techniques may involve modifying frequency components, phases, and/or gain levels in some embodiments (i.e., modification of the properties used in matching). These techniques further ensure that the captured segments assembled together are similar enough to sound natural when assembled as a new segment. In some embodiments, the media-editing application performs these assimilation techniques after the identified segments are assembled.

Figure 8:
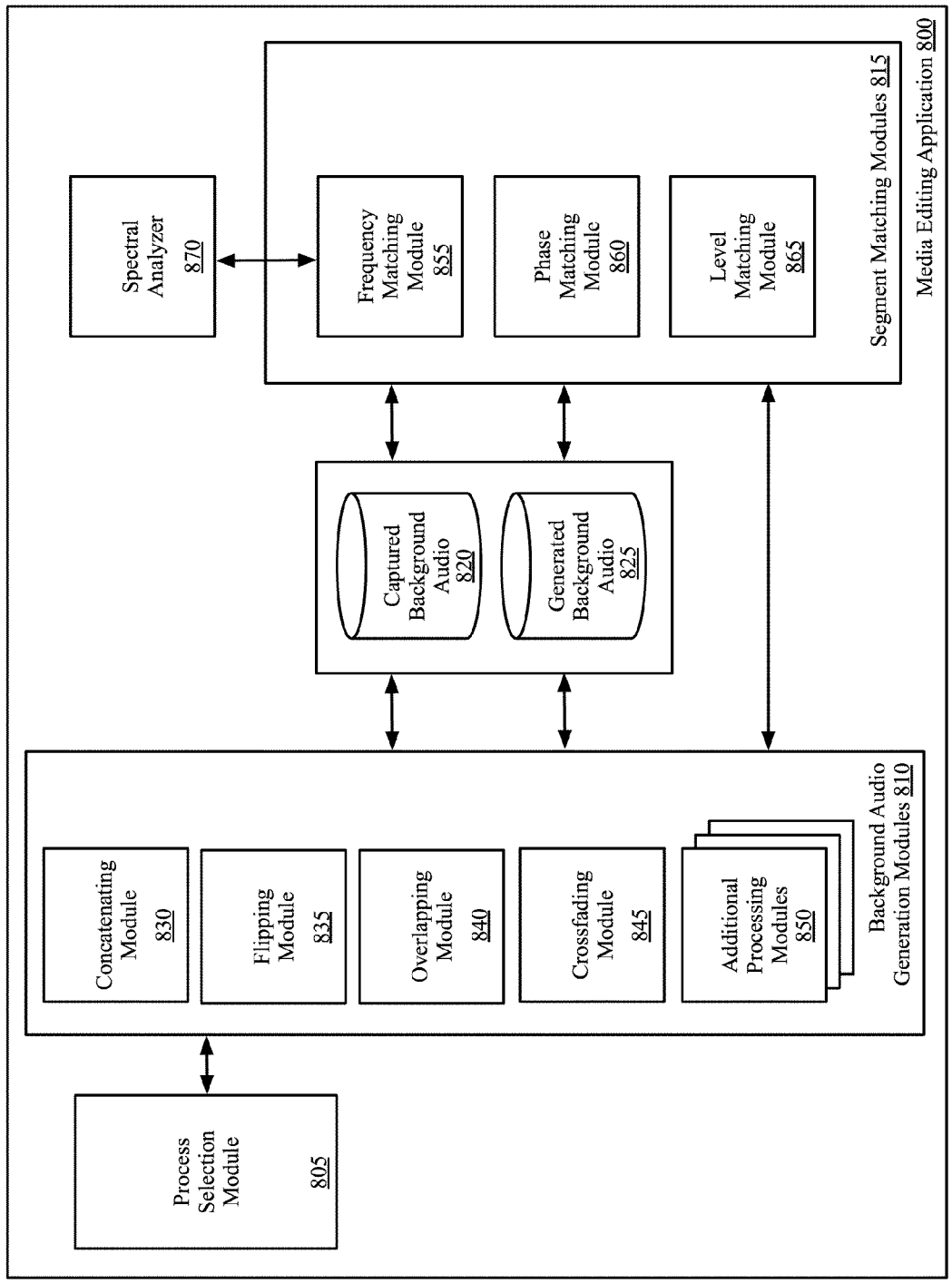
FIG. 8 conceptually illustrates the software architecture of a media-editing application of some embodiments that automatically generates additional background audio by performing various audio processing techniques on previously captured background audio.

FIG. 8 conceptually illustrates the software architecture of a media-editing application 800 of some embodiments that automatically generates additional background audio by performing various audio processing techniques on previously captured background audio. One of ordinary skill will recognize that the modules shown in this figure may be only a subset of the modules of media-editing application 800; other modules for performing media editing, generating a user interface and handling user interaction, etc., may be included as part of the media-editing application 800.

As shown, the media-editing application 800 includes a process selection module 805, background audio generation modules 810, segment matching modules 815, and a spectral analyzer 870. FIG. 8 also illustrates a captured background audio storage 820 and a generated background audio storage 825. In some embodiments, storages 820 and 825 are one physical storage. In other embodiments, the captured background audio and the generated background audio are stored in separate physical storages. In addition, either the captured background audio, the generated background audio, or both, may be spread throughout multiple physical storages.

To generate additional background audio, the process selection module 805 selects one or more of the background audio generation modules 810 to perform one or more operations on the captured background audio segments. In some embodiments, the process selection module 805 selects multiple modules for multiple operations to be performed on the background audio segments. Some embodiments of the process selection module 805 select only one module to perform one type of operation on the background audio segments. Some embodiments of the media-editing application allow the process selection module 805 to select which operations to perform on the captured background audio at random (e.g., using a random number generator or pseudo-random number generator). Other embodiments allow the user of the application to designate the number of processes that may be selected by the process selection module or the types of operations that can be selected by the process selection module.

The background audio generation modules 810 include a number of modules that can perform various audio processing operations on the captured background audio segments. Each of the background audio generation modules 810 retrieves captured background audio segments from the storage 820 and performs an operation on the retrieved segments when the module is selected by the process selection module 805. As mentioned above, in some embodiments the process selection module 805 selects a number of background audio generation modules 810 to perform a number of operations on the retrieved segments.

In this example, the background audio generation modules 810 include a concatenating module 830, a forward/backward flipping module 835, an overlapping module 840, a crossfading module 845, as well as additional processing modules 850. The types of operations that can be performed on captured background audio segments are by no means limited by those described in this section. The operations of each of the illustrated background audio generation modules 810 of some embodiments will be described by reference to FIGS. 9-14 below.

Figure 9:
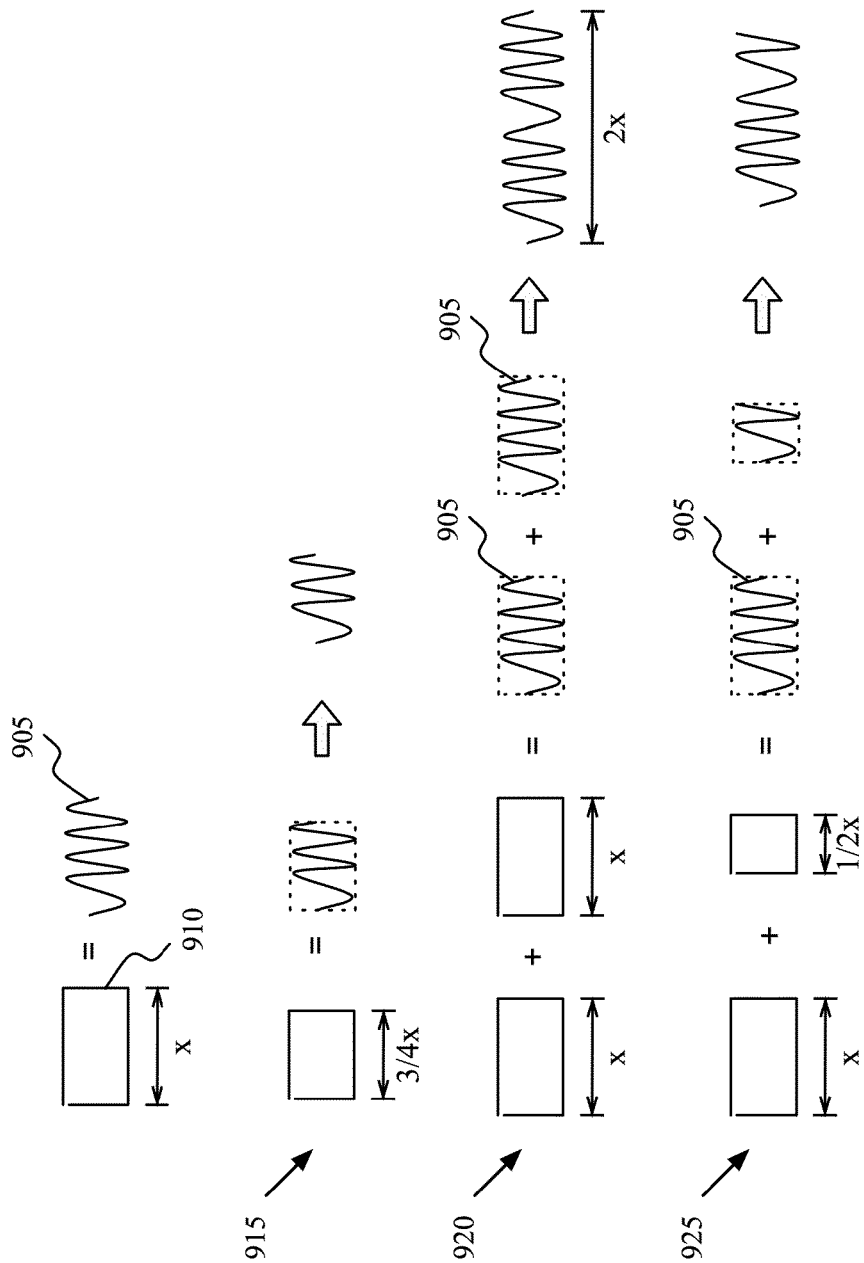
FIG. 9 conceptually illustrates examples of concatenation operations performed by a concatenation module.

One of the background audio generation modules 810 is the concatenating module 830 that concatenates two or more audio segments. FIG. 9 conceptually illustrates examples 915-925 of concatenation operations performed by a concatenation module (e.g., module 830). The concatenating module 830 of some embodiments appends a set of background audio segments to generate a concatenated segment having a length that is the sum of the lengths of individual background audio segments. The concatenating module 830 of some embodiments can generate a continuous audio segment of varying length. The concatenating module 830 may concatenate multiple copies of the same background audio segment and/or different background audio segments.

As shown in FIG. 9, a waveform 905 is represented by a block 910 having a length x. The example segment generation 915 illustrates generation of a segment that is ¾ x in length. While not technically a concatenation operation, this illustrates that a background audio segment may be trimmed to a shorter length.

In the example 920, the concatenating module concatenates two copies of the background audio segment 905, which results in one background audio segment with a length of 2x. In the example 925, the concatenating module 830 concatenates background audio segment 905 with a second background audio segment that is a fraction (in this case, one-half) of the background audio segment 905, resulting in a generated background audio segment with a length of 1.5x. As shown by these examples, the background audio generation module may concatenate copies of a background segment together or concatenate different segments (e.g., a segment and a portion of the segment as shown, or completely separate segments). Although the examples 920 and 925 shown in FIG. 9 only show concatenation of two background audio segments, the concatenation module 830 may concatenate multiple segments to form a longer audio segment.

Figure 10:
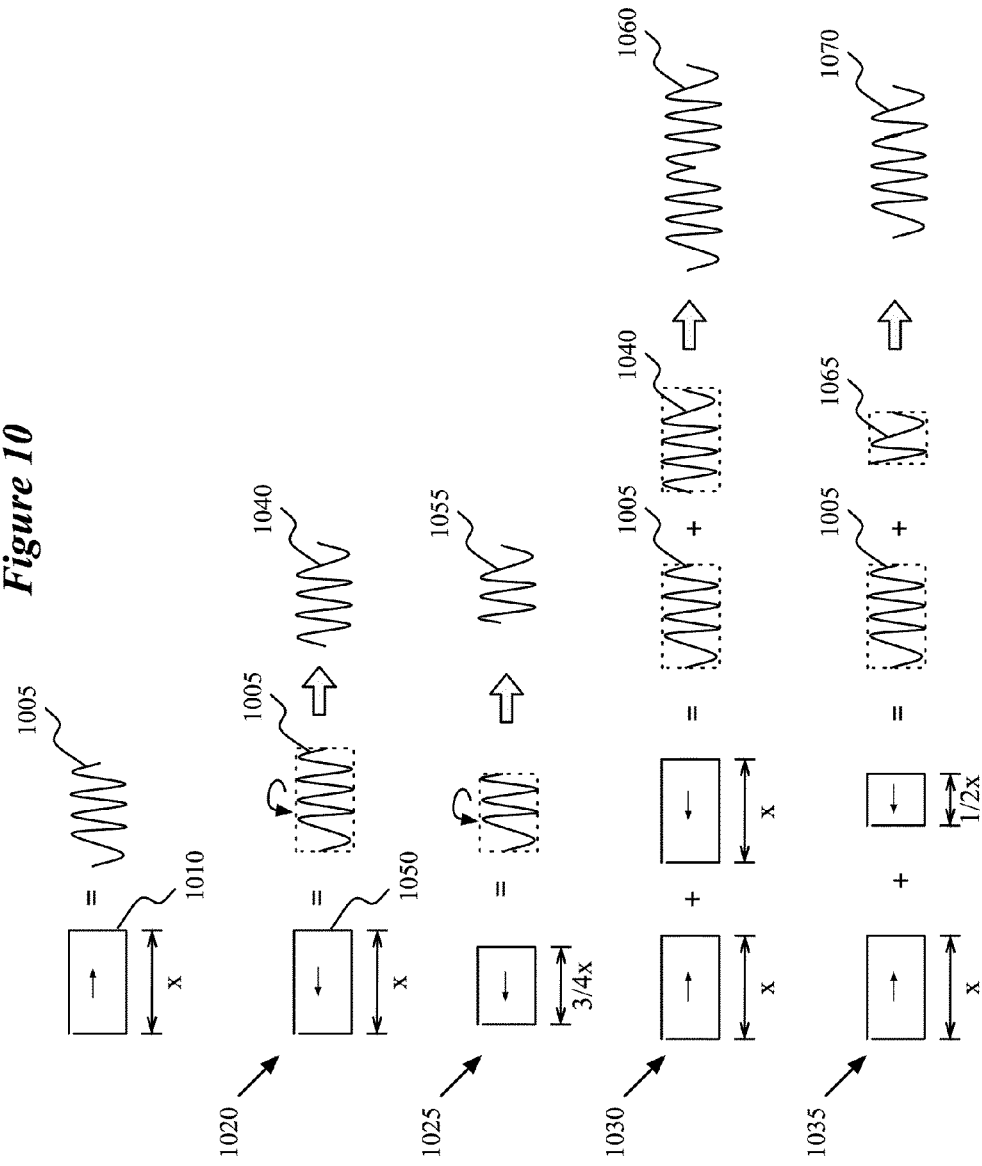
FIG. 10 conceptually illustrates examples of flip operations performed by a flipping module.

The background generation modules 810 also include a flipping module 835 for generating a reversed version of an audio segment. FIG. 10 illustrates examples 1020-1035 of flip (e.g., reversal) operations performed by a flipping module (e.g., module 835). A flip operation, in some embodiments, takes an audio signal and plays the audio signal backwards. Flipping an audio signal adds variation to the assembled segments and prevents the assembled segments from sounding too repetitive if several of the same segments are concatenated with each other. Flipping a segment of background noise will often work because there is not a logical ordering of the sounds that make up the background noise (i.e., the noise is often a near-constant sound).

In some embodiments, the flipping module 835 receives a background audio segment as an input signal and outputs a reversed version of the background audio segment. In this illustration, the waveform 1005 of a background audio segment as captured is represented by block 1010 having a length x. The flipping module 835 of some embodiments can flip the background audio segment 1005 so that the audio signal is reversed. In the example 1020, the flipping module 835 has flipped the input signal 1005 to output a reversed waveform 1040, as indicated by the arrow in block 1050.

The flipping module 835 of some embodiments can also flip a truncated portion of a background audio segment. In the example 1025, the flipping module 835 has flipped a portion of the background audio segment 1005 (the first three fourths of the segment 1005), producing a waveform 1055 that is a portion of the input waveform (having a length of ¾ x) in reverse.

The process selection module 805 of some embodiments may select multiple functions for the background audio generation modules 810 to perform on background audio segments retrieved from the captured background audio storage 820. In the example 1030, the background audio generation modules perform both flipping and concatenating operations. The flipping module 835 flips a copy of background audio segment 1005 to produce audio segment 1040. The concatenating module 830 then appends this new segment 1040 to another copy of background audio segment 1005 to generate a new background audio segment 1060. In the example 1035, the flipping module 835 flips only a portion of a copy of background audio segment 1005 to obtain the background audio 1065 having a length of ½ x. The concatenating module 830 then appends this new segment 1065 to another copy of background audio segment 1005 to generate a new background audio 1070.

One of ordinary skill in the art will recognize that the two operations used in the above examples (concatenation and reversal) do not commute with each other. That is, concatenating two audio segments and then flipping the concatenated segment will result in a different waveform than flipping the two segments and concatenating the flipped segments. This is also the case with many of the operations referred to in this section (i.e., that for these operations, the order in which the operations are performed makes a difference to the final audio output).

Figure 11:
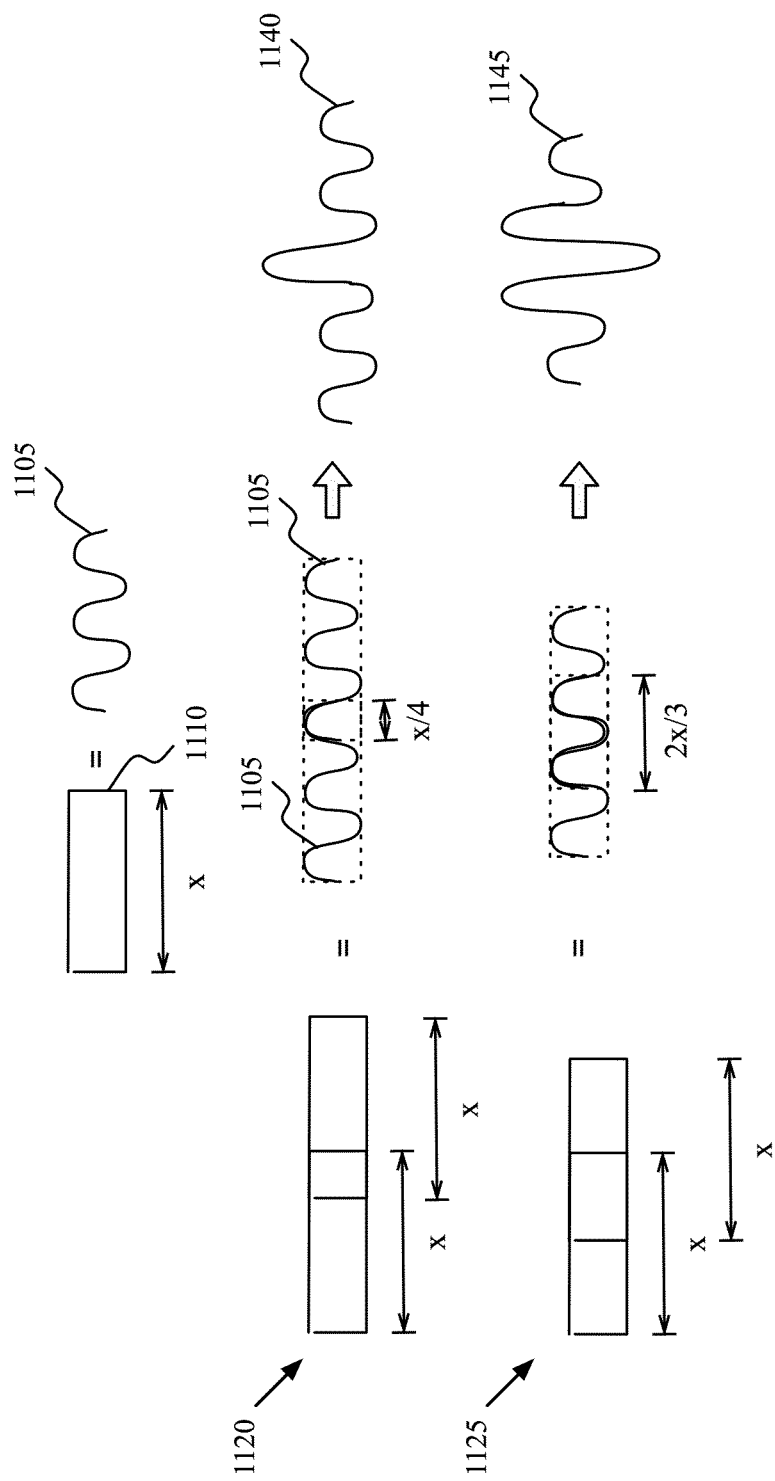
FIG. 11 conceptually illustrates examples of overlap operations performed by an overlapping module.

The background audio generation modules 810 also include an overlapping module 840 for overlapping portions of two audio segments. FIG. 11 illustrates examples 1120 and 1125 of overlapping operations performed by an overlapping module (e.g., module 840). The overlapping module 840 of some embodiments pieces together a set of background audio segments to generate a segment at least a portion of which includes a superposition of sections of two background audio segments.

In this illustration, the captured background audio segment 1105 retrieved from the captured background audio storage 820 is represented by block 1110 having a length x. In the example 1120, the overlapping module 840 of some embodiments performs an overlapping operation to piece together two copies of the same background audio segment 1105, generating a waveform 1140. The overlapping portions (i.e., with a length of ¼ x) of the signals are superimposed to generate a new segment having the waveform 1140. The example 1125 illustrates a similar operation on the same segments as in the previous example. In this example 1125, however, the overlapping portion is approximately two-thirds the length of the background audio segment 1105 (i.e., ⅔ x). In this case, the overlapping module 840 generates a waveform 1145 that is a superposition of the waveforms over a much larger portion of the output audio segment.

Figure 12:
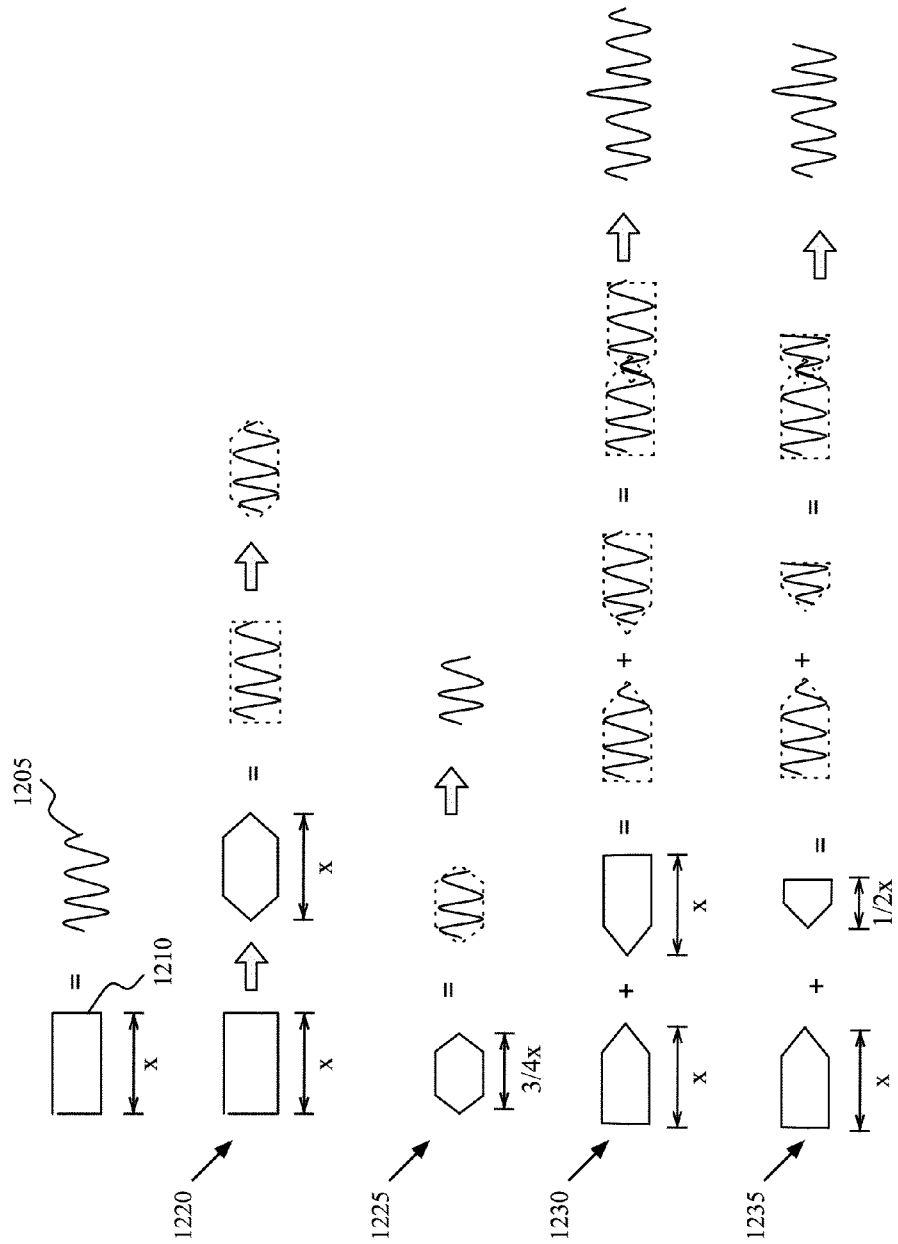
FIG. 12 illustrates examples of crossfading operations performed by a crossfading module.

The background audio generation modules 810 also include a crossfading module 845 for crossfading edges of concatenated, overlapping, or otherwise combined audio segments. FIG. 12 illustrates examples 1220-1235 of crossfading operations performed by a crossfading module (e.g., module 845). A crossfading operation between a first and second audio segment overlaps the segments slightly and lowers the volume of the first segment through the overlapping portion while correspondingly increasing the volume of the second segment throughout the overlapping portion. Crossfading between two audio segments often produces a more natural sounding transition between the segments.

In this illustration, the captured background audio segment 1205 retrieved from the captured background audio storage 820 is represented by block 1210 having a length x. Examples 1220 and 1225 illustrate single audio segments (one having length x and a second having length ¾ x) with the edges of the segments faded (i.e., with the amplitude of the waveform decreasing towards the edges.

In general, however, crossfading operations are not used on single audio segments, but rather at the intersection of two audio segments. Thus, when concatenating (or overlapping) two background audio segments, some embodiments will use crossfading module 845 at the junction of the two background audio segments to smooth the transition between the segments. In some embodiments, the process selection module 805 determines whether two concatenated, overlapped, or otherwise combined segments will be crossfaded at their edges.

In the example 1230, the concatenating module 830 concatenates two copies of background audio segment 1205 and the crossfading module 845 crossfades the edges of the two segments so that the end of the first segment lowers its volume as the beginning of the second segment correspondingly increases its volume. In the example 1235, the concatenating module 830 concatenates a copy of background audio segment 1205 with a truncated version of background audio segment 1205 and the crossfading module 845 crossfades the edges of the two segments in the same manner as in example 1230.

While the examples in FIGS. 9-12 illustrate the background audio generation modules 810 performing various operations on copies of a single background audio segment retrieved from the captured background audio storage 820, some embodiments will perform these operations on multiple different background audio segments.

Figure 13:
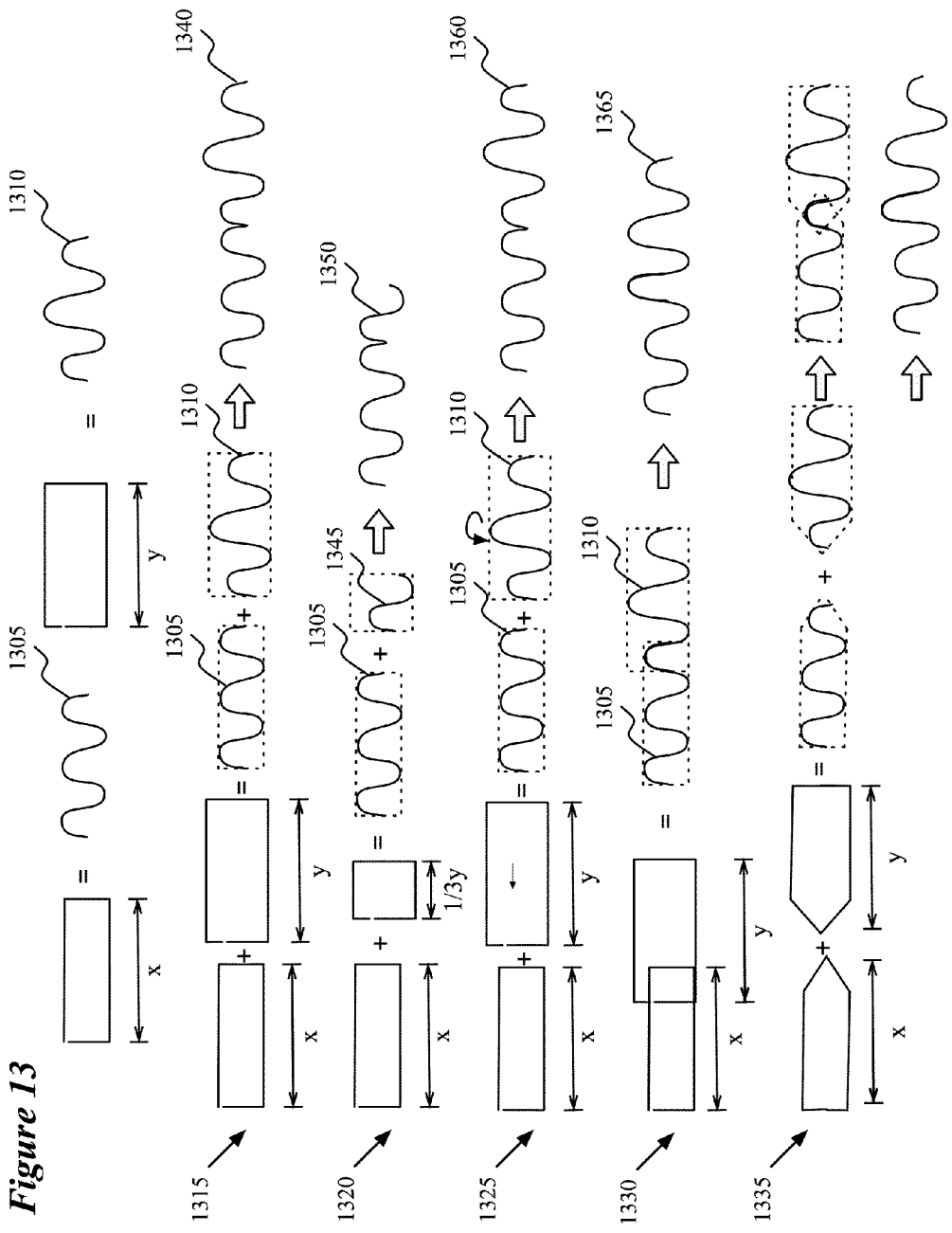
FIG. 13 illustrates examples of various operations performed by the background audio generation modules to generate new background audio segments from two different captured background audio segments.

FIG. 13 illustrates examples 1315-1335 of various operations performed by the background audio generation modules 810 to generate new background audio segments from two different captured background audio segments. The background audio generation modules 810 retrieve the two captured background audio segments 1305 and 1310 from storage 820. The background audio segments 1305 and 1310 each have a length of x and y, respectively. In this example, the two segments have the same frequency components and are in phase. As mentioned, some embodiments select segments to concatenate, overlap, etc. that have similar frequency and phase characteristics.

As described above, the concatenating module 830 concatenates two or more background audio segments together. In the example 1315, the concatenating module 830 appends segment 1310 to the end of segment 1305 to generate a new background audio segment 1340 having a length x+y. As shown in FIG. 9, some embodiments will concatenate a first audio segment with a fraction of a second audio segment. In the example 1320, the concatenating module 830 concatenates background audio segment 1305 with a fraction 1345 of background audio segment 1310 (the first third of the audio segment 1310), generating a new background audio segment 1350.

As also described above, the process selection module 805 may select multiple functions for the background audio generation modules 810 to perform on the retrieved background audio segments. In the example 1325, the flipping module 835 flips background audio segment 1310, and then the concatenating module 830 appends this flipped segment to background audio segment 1305 in order to generate a new background audio segment 1360. The overlapping module 840 and crossfading module 845 may also perform their respective operations on different background audio segments. In the example 1330, the overlapping module 840 overlaps a portion of the two different background audio segments 1305 and 1310 to generates a new background audio segment 1365 that includes the overlapping portion in which the waveforms of the two original segments 1305 and 1310 are superimposed. In the example 1335, the concatenating module 830 concatenates background audio segment 1305 with background audio segment 1310, then the crossfading module 845 crossfades the edges of the two segments at the junction of the segments.

As mentioned above, the background audio generation modules 810 also include additional processing modules 850 that can perform other processing operations on background audio segments for generating additional background audio. Additional processing modules 850 may include modules for blending background audio together in various forms (e.g., averaging an overlapped section rather than superimposing the waveforms), filtering modules (e.g., modules that filter out particular frequencies), etc. The processing operations that can be performed on background audio segments are by no means limited to those performed by the background audio generation modules 810 in FIG. 8.

When the process selection module 805 selects a background audio generation module 810 to perform an operation on a set of background audio segments, the background audio generation module 810 retrieves the set of background audio segments from the captured background audio storage 820. As mentioned above, before the background audio generation module 810 performs an operation on background audio segments, the media-editing application 800 of some embodiments performs segment matching techniques via segment matching modules 815 to identify background audio segments with similar characteristics (e.g., frequency spectra, phase, level, intensity, etc.). The media-editing application of some embodiments performs segment matching before the segments are assembled by the background audio generation module to ensure that only background audio segments with a threshold similarity are used together, thereby ensuring that the background audio inserted into the composite presentation has a realistic sound, rather than a choppy sound that jumps back and forth between background noises with different characteristics.

The segment matching modules 815 include a number of modules that can perform various segment matching operations on background audio segments. Segment matching operations (e.g., frequency matching, phase matching, gain level matching) retrieve a number of background audio segments from the storages 820 and 825 and compare the background audio segments to find the background audio segments that are most similar to each other in terms of frequency spectrum, phase, and/or gain level. In FIG. 8, the segment matching modules 815 include a frequency spectrum matching module 855, a phase matching module 860, and a level matching module 865.

The frequency spectrum matching module 855 of some embodiments retrieves a set of captured background audio segments from the storage 820 and performs frequency spectrum matching operations on the retrieved set of audio segments. To determine whether the frequency spectrums of the different segments match closely with each other, the frequency spectrum matching module 855 uses the spectral analyzer 870 to determine the frequency spectrum of each segment. The frequency spectrum matching module 855 then compares the frequency components of the segments to identify segments with similar frequency characteristics.

The frequency spectrum matching module 855 of some embodiments may additionally perform operations on the background audio segments to make two or more segments more similar to each other. The frequency spectrum matching module 855 may add or subtract frequencies from a first segment up to a certain extent in order to make the first segment similar to a second segment, or perform other such operations.

The phase matching module 860 of some embodiments retrieves a set of captured background audio segments from storage 820 and determines segments that are in phase or minimally out of phase. Some embodiments determine the segments that best match each other by first finding the phase of each segment retrieved and then comparing the phases of the segments. After identifying segments that are the closest in phase, some embodiments perform further processing to line up the phases of the signals (i.e., phase-shifting, frequency modifications, etc.).

The level matching module 865 of some embodiments retrieves a set of captured background audio segments from the storage 820 and identifies background audio segments that have similar gain levels. In addition, the level matching module 865 of some embodiments performs gain adjustment on the background audio segments when concatenating, overlapping, etc. the segments to generate new background audio segments. In order to maintain a consistent volume level of the background audio segments inserted into the composite presentation, some embodiments adjust the gain levels of the different segments (e.g., using dynamic compression, expansion, etc.) as the background audio generation modules 810 put them together so that the gain of a first segment is equal or close to equal to a gain of a second segment.

As mentioned, the segment matching modules 855-865 of some embodiments may perform frequency, phase, or level modifications to the segments in order to make the segments more similar. In some embodiments, these modules only modify the audio of a segment by a particular maximum amount. For instance, the frequency spectrum matching module 855 may only add or remove only a particular number of frequencies from a segment or modify the intensity of a frequency by a particular percentage in some embodiments. This serves to limit the extent to which the sound of an audio segment may be modified. When the segment matching modules 855-865 can not bring two segments to within a threshold similarity, some embodiments do not perform the specified operation (e.g., concatenation) on the two dissimilar segments.

While only three types of segment matching techniques (e.g., frequency spectrum matching, phase matching, level matching) are described here, one of ordinary skill would recognize that a media-editing application of some embodiments may perform various other kinds of segment matching techniques (e.g., intensity matching). In addition, while many of the features have been described as being performed by one module, one of ordinary skill would recognize that the functions might be split up into multiple modules, and the performance of one feature might even require multiple modules. Similarly, functions shown in this figure as being performed by multiple different modules might be performed by a single module (e.g., the frequency spectrum matching module 855 might contain its own spectral analyzer).

Figure 14:
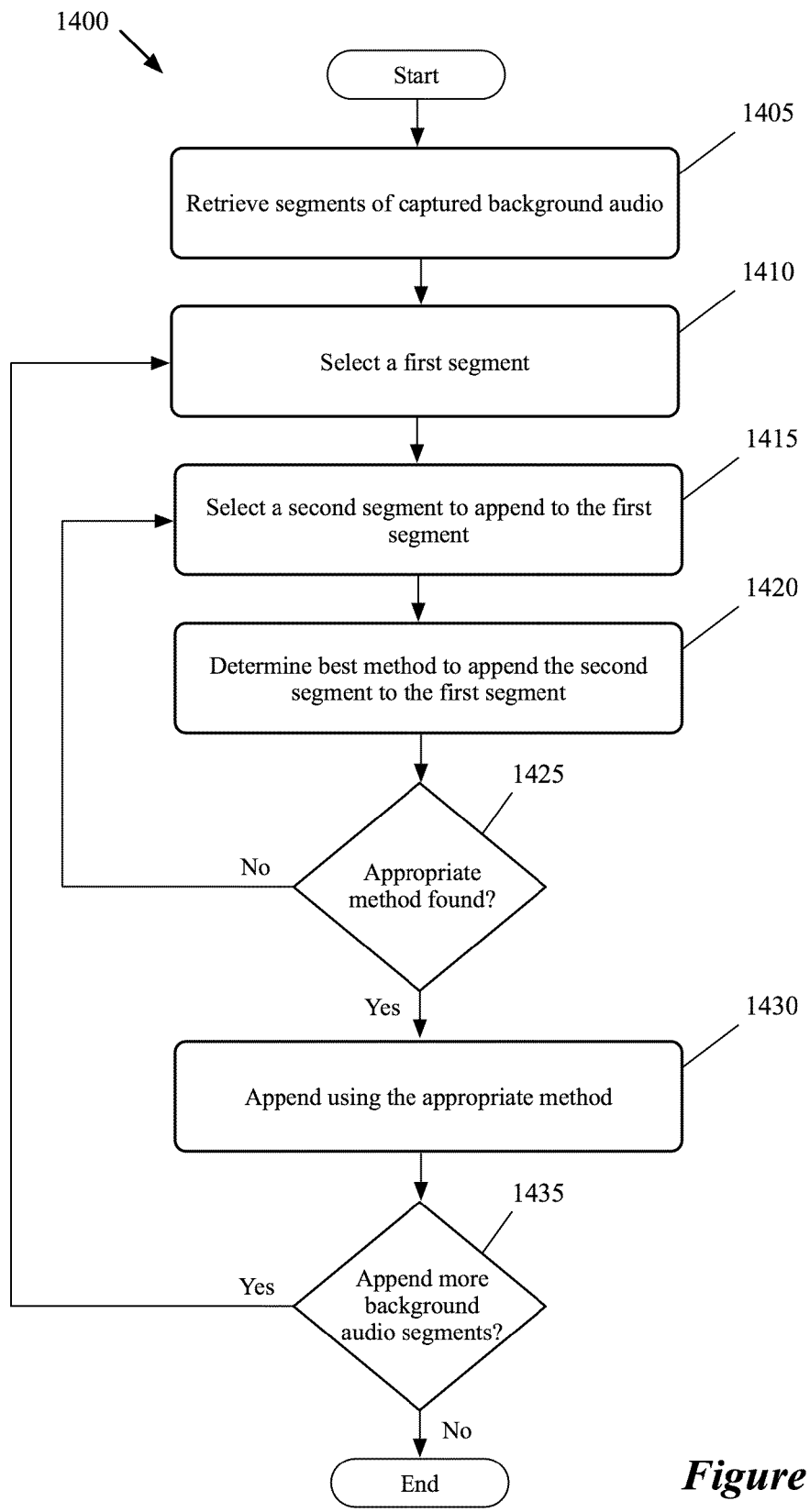
FIG. 14 conceptually illustrates a process of some embodiments for the generation of additional background audio from a set of background audio segments.

FIG. 14 conceptually illustrates a process 1400 of some embodiments for the generation of additional background audio from a set of background audio segments (e.g., audio segments captured by a process such as process 300 of FIG. 3). One of ordinary skill will recognize that the process 1400 may be performed at operation 115 of process 100 in some embodiments. As shown in FIG. 14, the process 1400 begins by retrieving (at 1405) segments of captured background audio. The media-editing application of some embodiments may retrieve the background audio segments from a captured background audio storage such as the storage 820 described in FIG. 8.

The process 1400 then selects (at 1410) a first segment from the retrieved segments. In some embodiments, a user of the media-editing application selects the first segment to use in appending background audio segments, while some embodiments automatically select the first segment during the creation process (e.g., randomly selecting the first segment to use in appending segments).

The process 1400 selects (at 1415) a second segment to append to the first segment. In some embodiments, the second segment is automatically selected with a random weighted probability. In other embodiments, a user of the media-editing application manually selects the second segment for appending to the first segment.

Some embodiments of the media-editing application perform matching operations in selecting the second segment(s) to use in assembling the new background audio segment. These may include various segment matching techniques that identify segments with similar characteristics (e.g., similar spectral characteristics, frequency components, phases, gain levels, intensities, etc.). During this process, the media-editing application may also adjust these characteristics of the segments in order to make the segments more similar.

The process 1400 then determines (at 1420) the best method to append the second segment to the first segment. It is desirable to append the second segment to the first segment in a way that the appended segment sounds like one smooth and continuous segment. In some cases this may mean overlapping the segments in a way that the phases match up, reversing one of the segments so that the frequency components close to the junction of the segments are similar, crossfading the edges of the segments together, etc. In some embodiments, the media-editing application automatically selects a combination of various audio processing operations to perform on the selected segments (e.g., randomly select from a set of operations) to assemble a new background audio segment. Some embodiments allow a user of the media-editing application to select various operations to perform on the selected segments. The audio processing operations may include concatenation operations, flip operations, overlap operations, crossfade operations, etc.

Some embodiments select the segments based on the characteristics of the segments, then modify the frequency spectrum, phase, gain, etc. of the segments before performing the various segment construction operations (e.g., concatenation, crossfading, etc.). On the other hand, some embodiments select an operation, then select segments for the operation and perform any required modification for the selected segments before performing the operation. After performing the selected operation, the application selects another operation, and repeats this process until the new segment is completely generated.

After determining a combination of various methods to perform on the segments, the process 1400 determines (at 1425) whether performing the combination of methods (by the media-editing application or by the user) on the segments would generate a smooth and continuous segment. If the process determines that the method(s) is appropriate (i.e., will generate a desirable segment), the process 1400 appends (at 1430) the segments using the appropriate method(s). If the process determines that the method(s) is not appropriate for generating a desirable segment, then the process returns to 1415 to select another segment to append to the first segment.

In some embodiments, the determination as to whether the method(s) is appropriate involves the determination of whether after performing assimilation techniques on the selected segments and then assembling the segments using the various selected operations, the generated segment would be sufficiently smooth and continuous. If the process determines that the generated segment would be sufficiently smooth and continuous, the process appends the segments and stores the newly generated background audio segment (e.g., in a storage such as storage 825). Some embodiments store the new segment in RAM for subsequent insertion into the composite presentation. Some embodiments store the new segment in a permanent storage (e.g., a hard disk) so that the segment can be inserted into the composite presentation right away or at a later time.

The process 1400 then determines (at 1435) whether to append additional background audio segments. The media-editing application may append additional background audio segments by performing different sets of operations on the same set of segments, or by using different background audio segments (and performing either the same set of operations or a different set of operations).

When the process 1400 determines that the media-editing application no longer needs to append more background audio segments, the process ends. Otherwise, the process determines that additional background audio segments should be appended, and returns to 1410 to select segments on which to perform various processing operations to further generate a new background audio segment.

III. Insertion of Background Audio

As described above, the media-editing application of some embodiments inserts background audio into a composite presentation of media clips. The media-editing application detects regions within the composite presentation that lack background audio completely or otherwise are in need of background audio. In some embodiments, the media-editing application inserts background audio into regions in the composite presentation that fall below an ambient noise level. The ambient noise level may be identified from a particular portion of the composite presentation, such as described in Section I above. In some embodiments, the regions that fall below the ambient noise level are regions that are quieter than the identified ambient noise level.

In some embodiments, the regions into which the media-editing application inserts background audio include regions between media clips (or at least between media clips containing audio). When there is complete silence, the composite presentation may sound awkward or artificial. Thus, the application inserts background audio into these regions in order to remove the artificial sound.

Additionally, regions within media clips may need background audio as well. These regions may include regions within a clip containing audio that fall below the ambient noise level, as well as regions that have significant sound levels but not background audio (e.g., a person talking with zero background audio). Such regions with no background audio may also have an artificial sound, even with the non-background audio.

Some embodiments automatically perform the detection of these regions and the insertion of the background audio without user input. On the other hand, some embodiments allow a user to select which types of regions the media-editing application should detect to receive inserted background audio and/or into which detected regions the application should insert the background audio.

A. Detecting Regions that Fall Below the Ambient Noise Level

As mentioned, the regions into which a media-editing application inserts background audio may include regions in which the audio falls below the ambient noise level. These regions may include silent regions between media clips containing audio as well as silent or low-volume regions within a media clip. The insertion of appropriate background audio into these regions can give the composite presentation a more consistent level of background audio, thereby creating a more natural and consistent sound.

Figure 15:
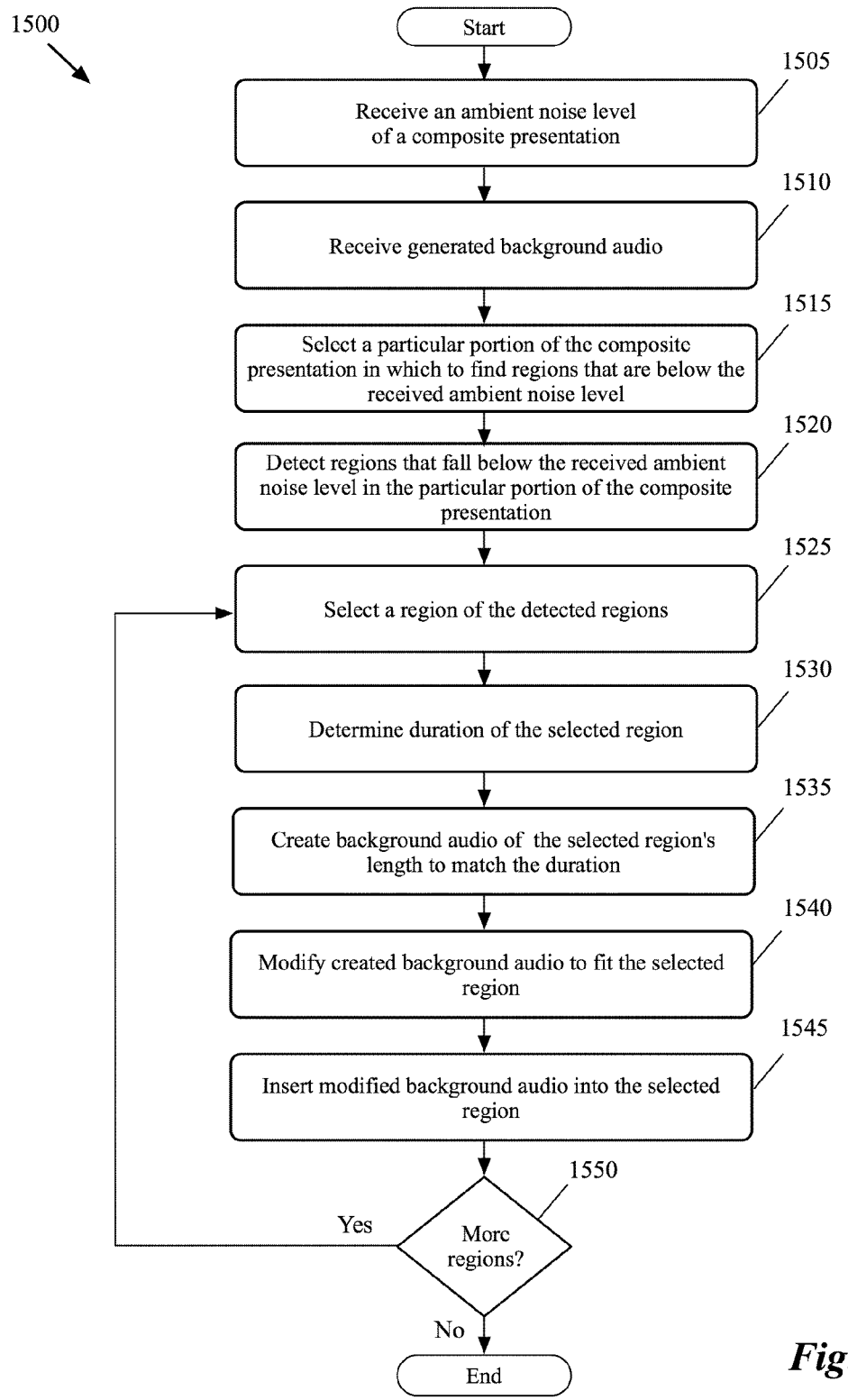
FIG. 15 conceptually illustrates a process of some embodiments for inserting background audio into regions in a composite presentation that fall below the ambient noise level.
Figure 16:
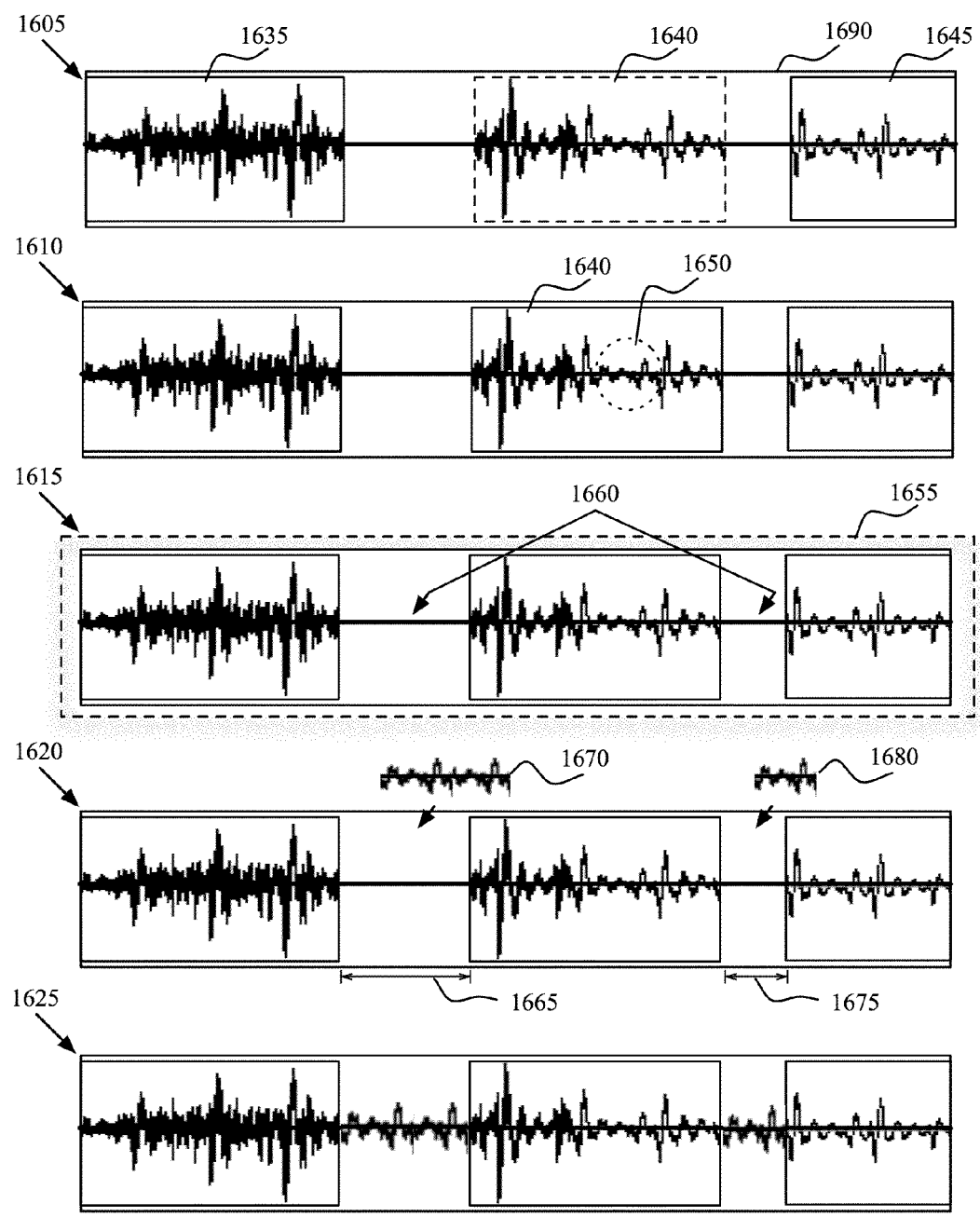
FIG. 16 illustrates the insertion of background audio in between media clips.

FIG. 15 conceptually illustrates a process 1500 of some embodiments for inserting background audio into regions in a composite presentation that fall below the ambient noise level. One of ordinary skill will recognize that the process 1500 may be performed at operations 120 and 125 of process 100 in some embodiments. The process 1500 will be described by reference to FIGS. 16-18, which illustrate three different examples of the detection of regions below the ambient noise level and subsequent insertion of background audio into the detected regions. FIG. 16 illustrates the insertion of background audio in between media clips, FIG. 17 illustrates the insertion of background audio within media clips based on background audio retrieved from a different clip, and FIG. 18 illustrates the insertion of background audio within a media clip from which the background audio was retrieved.

As shown in FIG. 15, the process 1500 begins by receiving (at 1505) an ambient noise level of a portion of a composite presentation. As mentioned above, the ambient noise level of some embodiments is detected from a portion (e.g., by a user of the media-editing application) of the composite presentation from which background audio is then captured (e.g., as described in Section I). This portion may be a single clip, a portion of a clip, multiple clips, etc.

Figure 17:
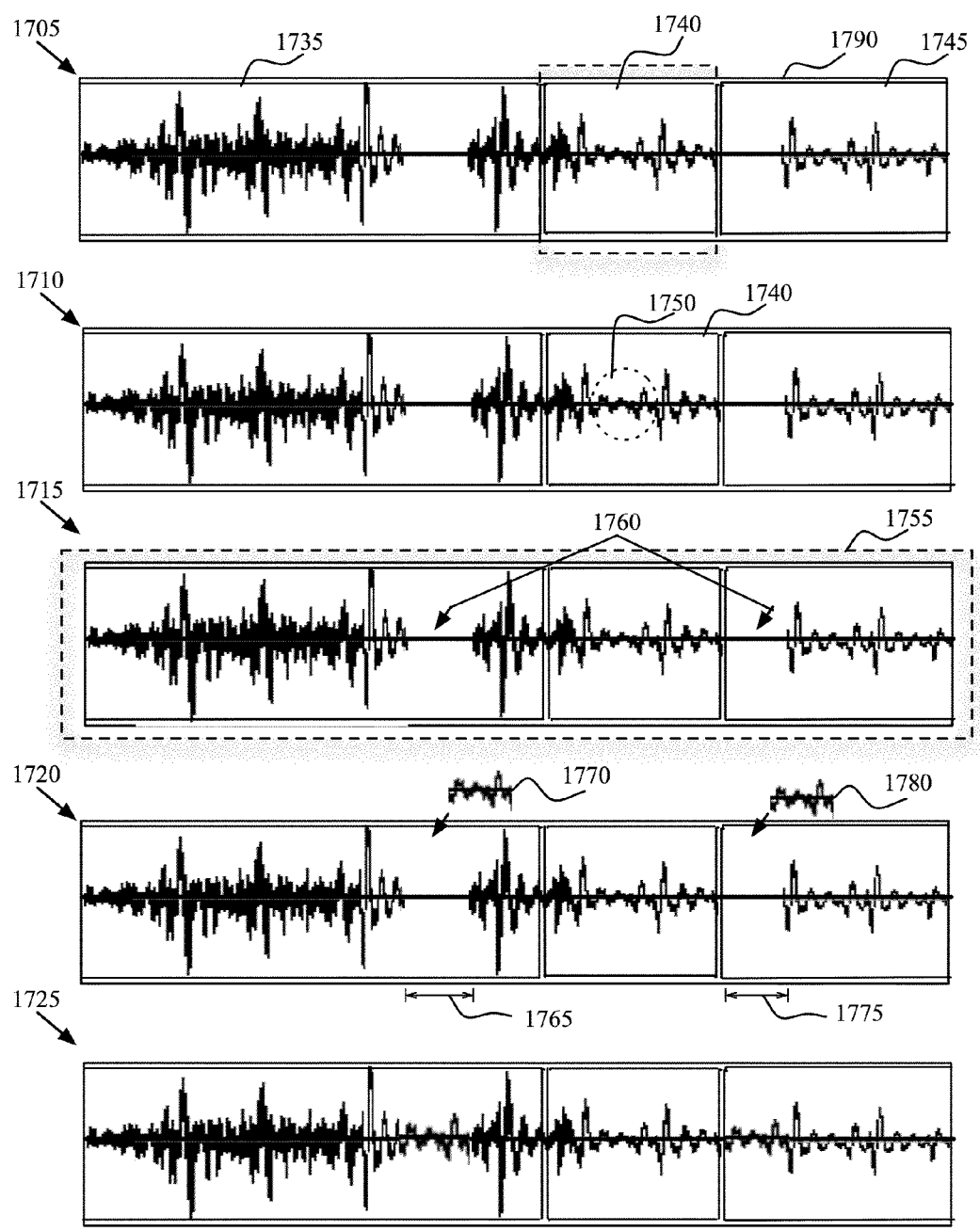
FIG. 17 illustrates the insertion of background audio within media clips based on background audio retrieved from a different clip.
Figure 18:
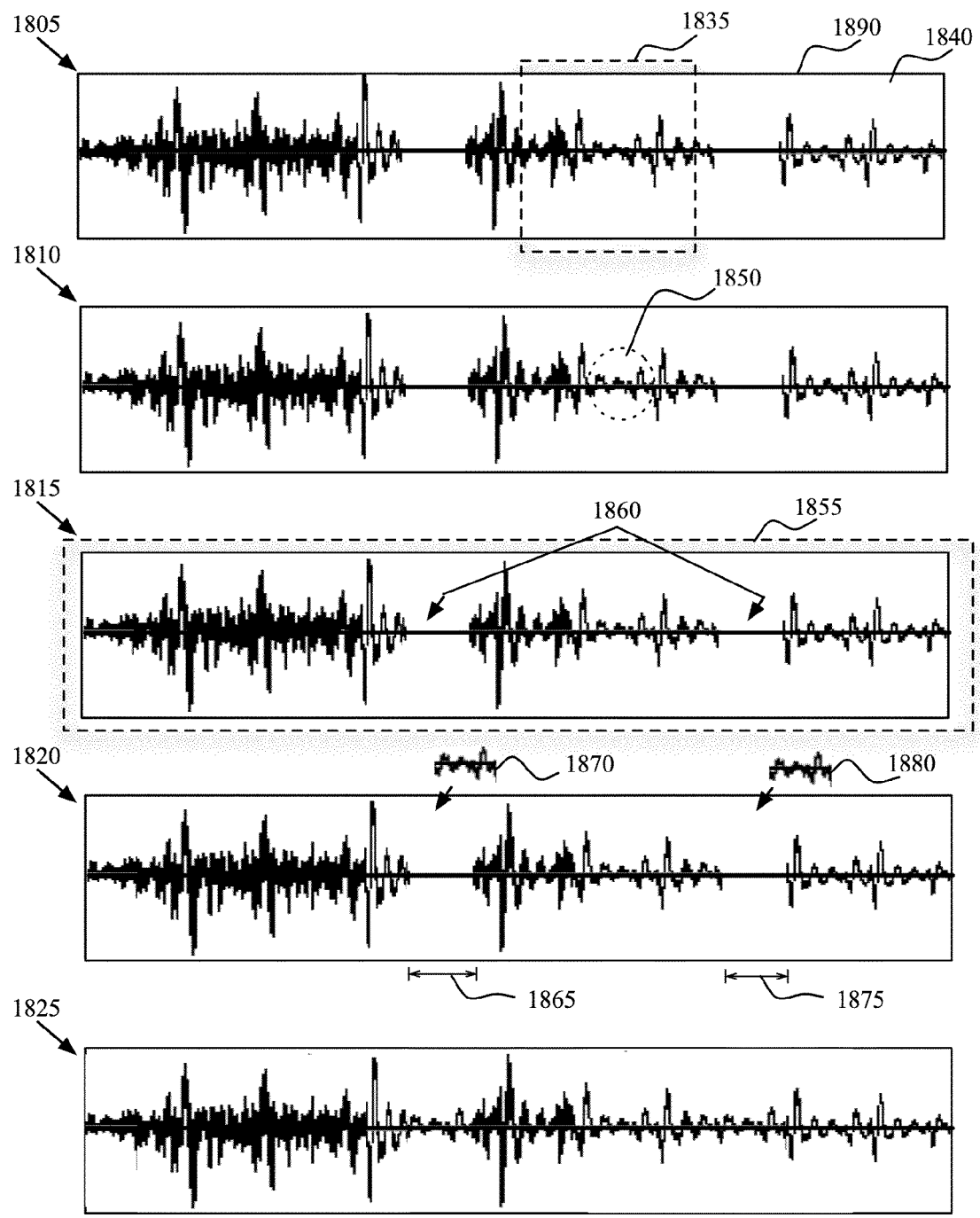
FIG. 18 illustrates the insertion of background audio within a media clip from which the background audio was retrieved.

The first stages 1605, 1705, and 1805 of FIGS. 16-18 illustrate determination of an ambient noise level from a portion of a composite presentation. The composite presentation 1690 in FIG. 16 includes at least three different clips 1635, 1640, and 1645. The composite presentation also includes gaps between these clips. In this case, the portion from which the application detects the ambient noise level and retrieves background audio is the whole of clip 1640.

The composite presentation 1790 in FIG. 17 also includes at least three different clips 1735, 1740, and 1745. The composite presentation 1790 does not include gaps between these clips. In this case, the portion from which the application detects the ambient noise level and retrieves background audio is also a single clip, clip 1740. The composite presentation 1890 in FIG. 18 includes only a single clip 1840. The portion of the composite presentation from which the application detects the ambient noise level and retrieves background audio is a portion 1835 of the single clip 1840.

The second stages 1610, 1710, and 1810 of FIGS. 16-18 illustrate the identification of background audio from the respective portions of the composite presentation. As shown in FIG. 16, the media-editing application identifies and captures background audio 1650 from within the clip 1640. Similarly, in FIG. 17, the application identifies and captures background audio 1750 from the clip 1740. In FIG. 18, the background audio 1850 is identified and captured from within the identified portion 1835. As described above, after identification of the background audio from the portion of the composite presentation, the media-editing application of some embodiments generates additional background audio from the identified background audio. In some embodiments, the generated background audio is then be stored in a storage (e.g., memory, permanent storage, etc.).

Returning to FIG. 15, the process 1500 receives (at 1510) generated background audio. This audio may include background audio segments generated as described in Section II, using various audio processing and matching operations to generate background audio particularly tailored for the composite presentation. This background audio may be retrieved from a data storage (e.g., RAM or permanent storage) in some embodiments.

Next, the process 1500 in FIG. 15 selects (at 1515) a particular portion of the composite presentation in which to identify regions that are below the received ambient noise level. In some embodiments, this particular portion of the composite presentation can be selected by the user of the media-editing application. Some embodiments automatically select the entire composite presentation as the particular portion.

The process then detects (at 1520) regions that fall below the received ambient noise level in the particular portion of the composite presentation. As mentioned above, the regions that fall below the ambient noise level are often the regions between the clips composited or regions outside of the identified portion of the composite presentation with a volume level that is lower than the ambient noise level. As with the detection of the ambient noise level, some embodiments use the RMS power over a minimum time duration to determine whether a region falls below the ambient noise level. Using a minimum duration ensures that a very short region that happens to have one or two low-level peaks is not selected for the insertion of background noise.

The third stages 1615, 1715, and 1815 of FIGS. 16-18 illustrate that a particular portion of the composite presentation in which to detect sub-ambient noise level regions has been selected. In these figures, the selected regions 1655, 1755, and 1855 (i.e., the entirety of the illustrated presentation) are indicated by dotted lines. The third stages of these figures also illustrate the detection of regions that fall below the received ambient noise level within the particular portions.

The detected regions are indicated by the arrows 1660, 1760, and 1860 in FIGS. 16-18. In FIG. 16, the detected regions are the regions between the media clips 1635, 1640, and 1645. In FIG. 17, the detected regions are regions within media clips 1735 and 1745 (the clips other than the clip from which the ambient noise level was detected). In FIG. 18, the detected regions are within the same clip 1840 as that from which the ambient noise level was detected.

The process 1500 in FIG. 15 then selects (at 1525) one of the detected regions in which the audio falls below the ambient noise level. The process 1500 determines (at 1530) the duration of the selected region. The media-editing application may determine the duration of the selected region by identifying when the volume level begins to fall below the ambient noise level and when the volume level rises above the ambient noise level.

The process 1500 then creates (at 1535) background audio of the selected region's duration in order to fit the background audio into the selected region. As mentioned, in some embodiments the media-editing application will have already generated one or more background audio segments for insertion into the composite presentation (i.e., the audio received at operation 1510). Some embodiments will remove a portion from either end of a received audio segment to create a segment of the appropriate duration for the currently selected region. When the region has a duration longer than the generated background segments, some embodiments concatenate two or more of the segments or repeat one of the segments multiple times in order to create a segment of the required length. Some embodiments may also examine properties of the audio surrounding the insertion region in order to select an appropriate segment or segments for insertion (i.e., by examining frequency components, phase, etc. of the surrounding audio).

The process 1500 then modifies (at 1540) the created background audio to fit the selected region. The media-editing application may perform various processing methods on the background audio to more seamlessly fit the background audio into the surrounding audio for a continuous sound. These processing operations may include crossfading the edges of the inserted audio with the surrounding audio, level matching (i.e., gain control) to remove any volume jumps in the background sound, etc.

Then the process 1500 inserts (at 1545) the modified background audio into the selected region. Some embodiments insert each segment as a separate new clip in the composite presentation. When inserting a segment in between media clips, the application may insert the segment as a clip on the same track of the composite presentation as the other clips between which it is inserted. When inserting a segment at the same time as another audio clip, however, the media-editing application may insert the segment on a separate track, possibly creating a new track of the composite presentation into which the clips are inserted.

The fourth stages 1620, 1720, and 1820 of FIGS. 16-18 illustrate insertion of audio into the composite presentations 1690, 1790, and 1890 respectively. In FIG. 16, a first segment 1670 and second segment 1680 are inserted into regions 1665 and 1675, respectively. The region 1665 has a duration of a particular length, and the inserted background audio segment 1670 has the same length, as it is tailored for insertion into region 1665. Similarly, region 1675 has its own duration (shorter than that of region 1665), and the segment 1680 is similarly tailored for this region. Upon insertion of the audio segments, the application may crossfade the edges of the segments with the surrounding audio, adjust the level of the inserted background segment to match background audio in the surrounding audio, etc. In this case, some embodiments insert the segments as separate audio clips in between the clips 1635, 1640, and 1645 (e.g., on the same track as these clips).

In FIG. 17, a first segment 1770 and second segment 1780 are inserted into regions 1765 and 1775, just as with the corresponding segments in FIG. 16. Some embodiments insert these segments as separate audio clips on a track separate from clips 1735 and 1740, as the segments overlap these clips in the composite presentation 1790. Similarly, in FIG. 18, a first segment 1870 and second segment 1880 are inserted into regions 1865 and 1875. Again, some embodiments insert these segments as separate audio clips on a track separate from clip 1840, as the segments overlap this clip. In both of these figures, the segment is shown as inserted directly into the surrounding waveform in order to illustrate a continuous waveform.

Returning to FIG. 15, the process 1500 determines (at 1550) whether any detected regions remain in which to insert background audio. When additional detected regions remain that need background audio, the process returns to 1525 to select another region into which to insert an appropriate background audio segment. Once the process has inserted background audio into all of the detected sub-ambient noise level regions, the process ends.

The last stages 1625, 1725, and 1825 of FIGS. 16-18 show the final waveform of the audio of the respective composite presentations 1690, 1790, and 1890, after background audio segments have been properly inserted into each of the detected regions. As shown in these examples, background audio segments may be inserted into regions having a variety of lengths that may be between clips of a composite presentation, in the middle of such clips, or at the edges of such clips.

B. Detecting Regions with Sound but not Background Audio

In addition to regions with sound levels below the ambient noise level, some embodiments also insert background audio into regions that have higher sound levels, but lack background audio. In order to detect such regions, the media-editing application has to distinguish between background audio and non-background audio using characteristics other than volume level. Some embodiments use the spectral characteristics (i.e., frequency components) of the audio to determine whether audio is background or non-background audio.

Figure 19:
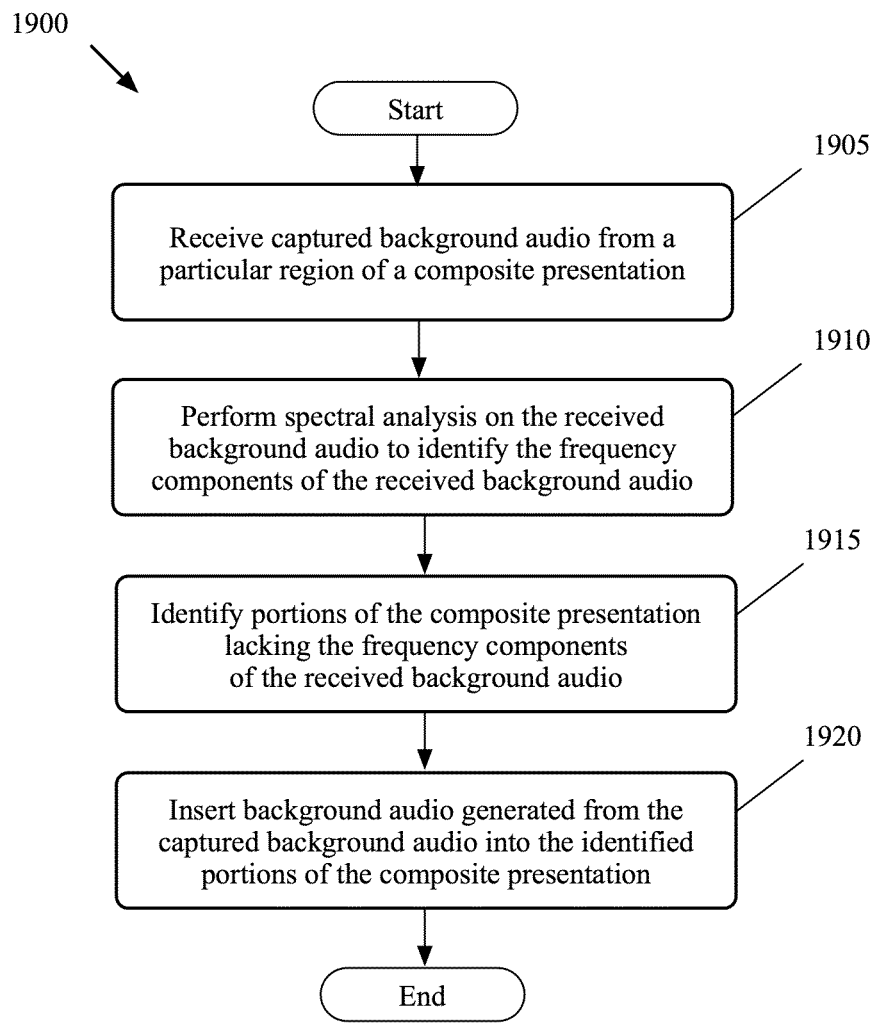
FIG. 19 conceptually illustrates a process of some embodiments for inserting background audio into regions with sound but lacking background audio.

FIG. 19 conceptually illustrates a process 1900 of some embodiments for inserting background audio into regions with sound but lacking background audio. One of ordinary skill will recognize that the process 1900 may be performed at operations 120 and 125 of process 100 in some embodiments. Some embodiments perform processes 1500 and 1900 at the same time, or perform a single process that combines the operations of these two processes to detect regions in need of background audio and then insert background audio into the regions.

Figure 20:
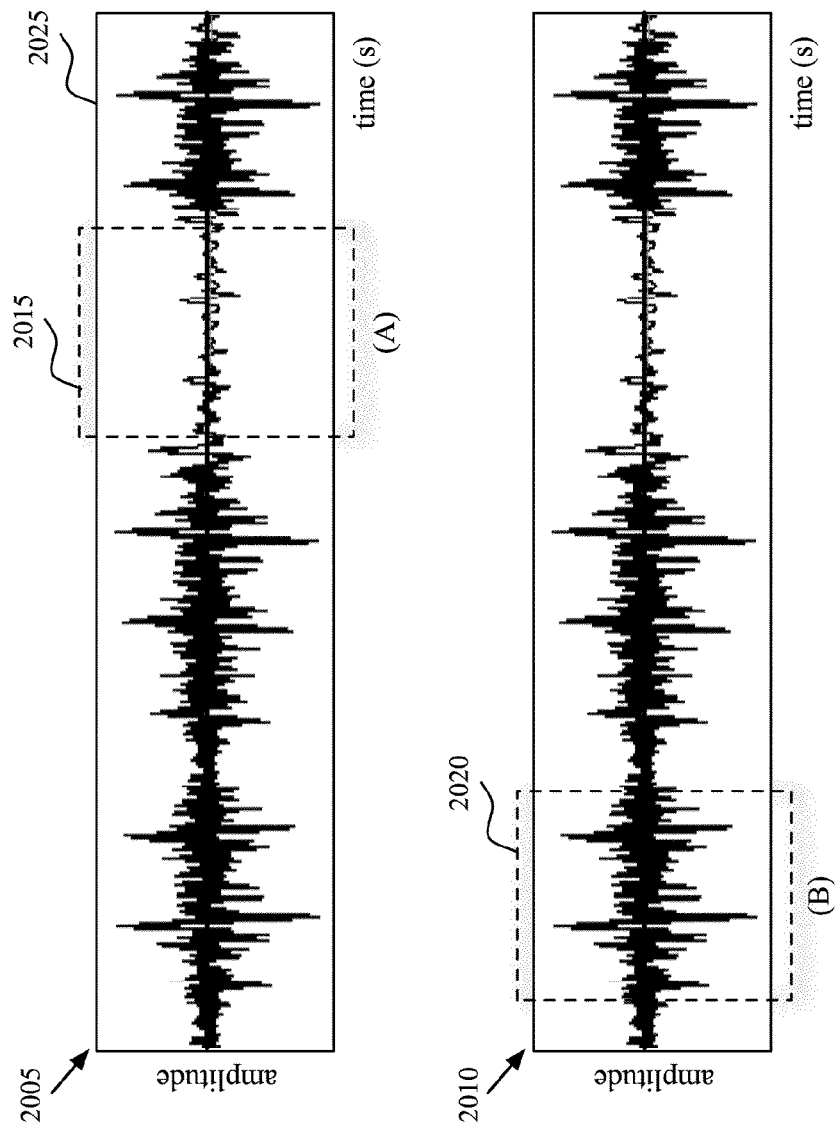
FIG. 20 illustrates an audio waveform of a portion of a composite presentation.
Figure 21:
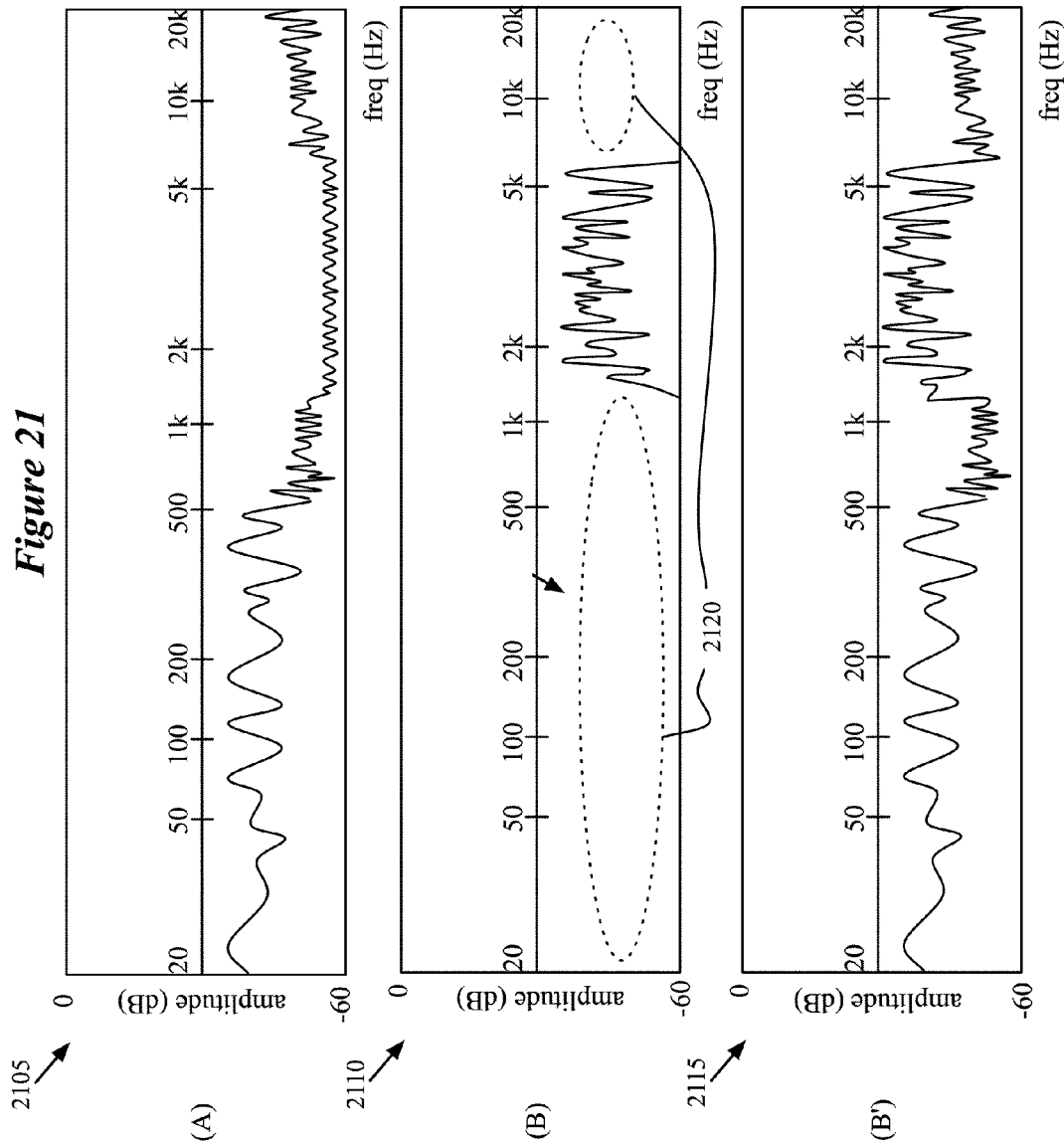
FIG. 21 illustrates three examples of spectral analysis (frequency v. sound level) of (i) a first portion of the composite presentation that contains background audio, (ii) a second portion of the composite presentation that contains audio but no background audio, and (iii) the second portion of the composite presentation after the insertion of background audio.
Figure 22:
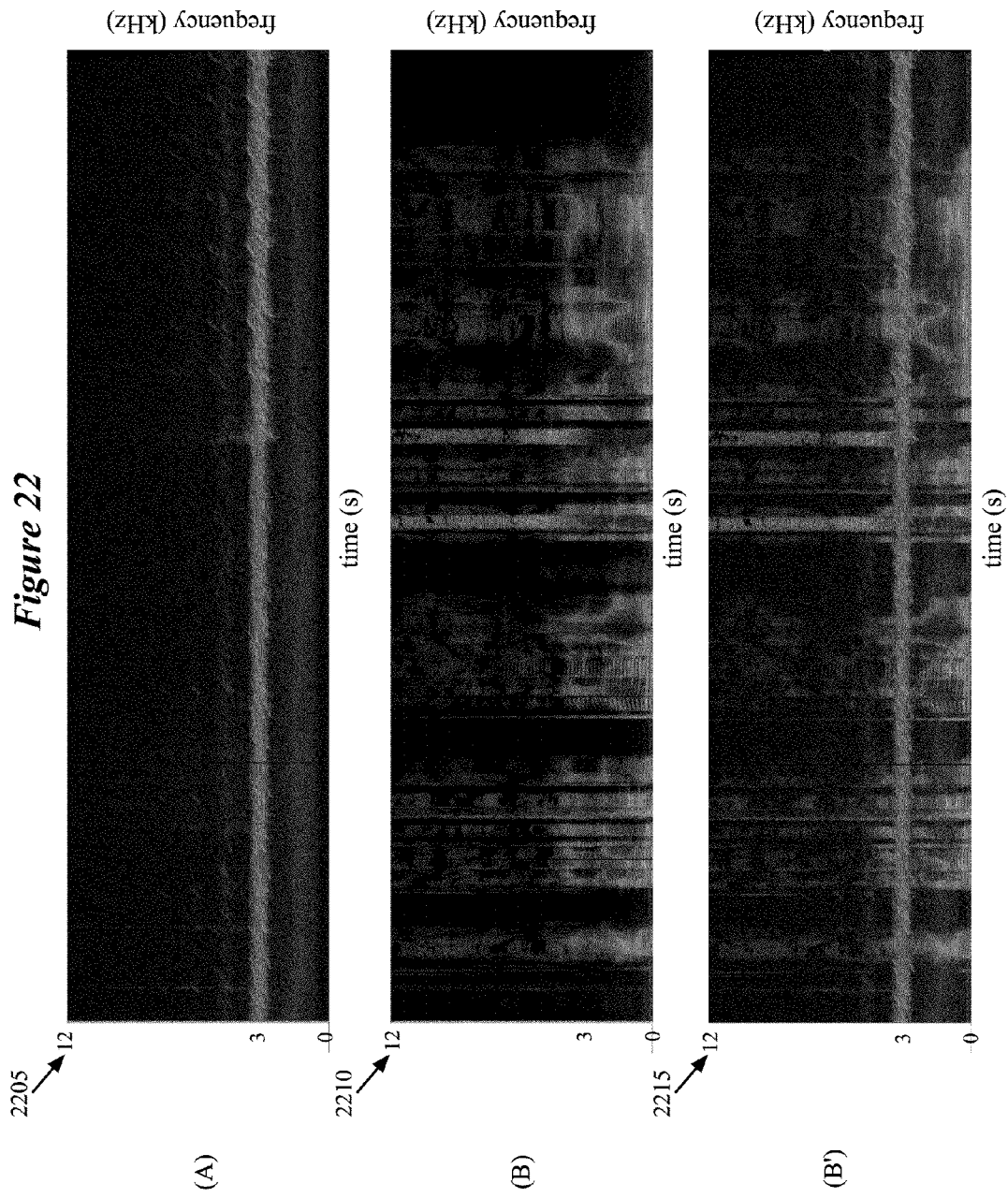
FIG. 22 illustrates three examples of spectrograms (time v. frequency) of (i) a first portion of the composite presentation that contains background audio, (ii) a second portion of the composite presentation that contains audio but no background audio, and (iii) the second portion of the composite presentation after the insertion of background audio.

The process 1900 will be described by reference to FIGS. 20, 21, and 22, which illustrates an example of the insertion of background audio into a region with sound but lacking background audio. FIG. 20 illustrates an audio waveform of a portion of a composite presentation. FIG. 21 illustrates three examples of spectral analysis (frequency v. sound level) of (i) a first portion of the composite presentation that contains background audio, (ii) a second portion of the composite presentation that contains audio but no background audio, and (iii) the second portion of the composite presentation after the insertion of background audio. FIG. 22 illustrates three examples of spectrograms (time v. frequency) of (i) a first portion of the composite presentation that contains background audio, (ii) a second portion of the composite presentation that contains audio but no background audio, and (iii) the second portion of the composite presentation after the insertion of background audio. The audio from which the spectral graphs shown in FIG. 21 are derived are not the same audio of which spectrograms are presented in FIG. 22.

As shown in FIG. 19, the process 1900 begins by receiving (at 1905) background audio captured from a particular region of a composite presentation. Some embodiments capture the background audio using the processes described in Section I above, or using different methods. The first stage 2005 of FIG. 20 illustrates a region 2015 of the composite presentation 2025 that contains background audio. The media-editing application captures this background audio and stores the background audio segment for later use (e.g., for generating new audio as described in Section II, for using to identify spectral characteristics of background audio, etc.).

The process 1900 next performs (at 1910) spectral analysis on the received background audio to identify the frequency components of the received background audio. Many well-known techniques may be used to identify frequency components of a portion of background audio (e.g., using Fourier transforms).

The first stage 2105 of FIG. 21 illustrates the frequency spectrum of the captured background audio from region 2015. In this spectral graph, the vertical axis represents amplitude extending from −60 dBs to 0 dBs, and the horizontal axis represents frequency extending from 20 Hz to 20 kHz (i.e., the human audible spectrum). The spectral graph illustrates the frequency components integrated over a particular time period; in this case, the time period of region 2015. In this particular example, the frequency spectrum of the background audio ranges over the entire audible spectrum, as is often the case with background audio. In some cases, however, the background audio frequencies will be confined to a particular section of the audible spectrum (as shown in FIG. 22 below).

The first stage 2205 of FIG. 22 illustrates the spectrogram of the captured background audio from region 2015. Some embodiments identify portions of the audio clip that contain audio (e.g., human speech) but lack background audio by looking at the spectrogram of portions of the audio clip. In this example 2205, the region 2015 contains background audio captured from an evening in the marshland with crickets chirping. The horizontal axis represents time over a duration of a few seconds, while the vertical axis represents frequency extending from 0 to 12 kHz. In some embodiments, the frequency spectrum of the background audio is confined to a particular section of the audible spectrum, such as in this particular example. The frequency spectrum of the background audio here ranges from approximately 1kHz to 6 kHz. The visible band around 3 kHz represents the continual drone of some sort of crickets present in the marshlands. In some embodiments, the frequency spectrum of the background audio ranges over the entire audible spectrum.

Next, the process 1900 identifies (at 1915) portions of the composite presentation lacking the frequency components of the received background audio. The media-editing application of some embodiments splits the audio signal of the composite presentation into segments based on a sampling rate (e.g., 0.2 seconds, 0.4 seconds, 5 seconds, etc.), and identifies the spectral components for each segment. When a particular segment lacks certain frequencies associated with background audio, then the application identifies the segment as needing background audio.

Often, multiple consecutive segments will lack background audio, and the media-editing application combines such segments to create a single region into which to insert background audio. In some embodiments, when a first segment contains background audio and an abutting segment does not contain background audio, the media-editing application will use a shorter sampling rate within these segments to identify more accurately the border between the region containing background audio and the region not containing background audio.

The second stage 2010 of FIG. 20 illustrates a region 2020 of the composite presentation that lacks background audio. This region 2020 is approximately the same duration as the duration of the background audio region 2015. The second stage 2110 of FIG. 21 illustrates the frequency spectrum of the region 2020 that lacks background audio. As shown in this spectral graph, the frequency components of the sampled portion only run from approximately 1kHz to 6 kHz. As shown by the dotted ovals, the frequency spectrum of the sampled portion does not include the lower audible frequencies (i.e., 20 Hz to 1 kHz) or the higher audible frequencies (6 kHz to 20 kHz). In addition, the frequency components in the 1 kHz to 6 kHz region are much stronger in region 2020 than in region 2015.

The second stage 2210 of FIG. 22 illustrates the spectrogram of the region 2020 that lacks background audio. In this example, the region contains speech with almost no background noise. As shown, the background of this region is clean (i.e., black) and, noticeably, there is no drone visible at approximately 3 kHz. This indicates that the desired background audio (i.e., chirping crickets) is not present in this portion of the audio and therefore should be added. Different embodiments may use different techniques to determine whether a sampled region is adequately dissimilar from background audio to be deemed lacking background audio. Some embodiments simply look for large sections of the spectrum with no frequency components at all to determine that a region lacks background audio. Other embodiments perform comparisons of the strength of frequency components in a sampled region to the strengths in the background audio (e.g., looking for particular components that are strong in the background audio to show up in the sampled regions).

Returning to FIG. 19, the process 1900 then inserts (at 1920) background audio generated from the captured background audio into the identified portions of the composite presentation. In some embodiments, this involves performing similar operations as those described by reference to FIG. 15 above. That is, the media-editing application creates background audio that matches the duration of the region into which the background audio will be inserted, crossfades the edges of the background audio with surrounding audio, adjusts the gain level of the background audio for continuity, etc.

The third stage 2115 of FIG. 21 illustrates the frequency spectrum of region 2020 after the insertion of background audio generated from the captured audio of region 2015. As shown, the frequencies from 1 kHz to 6 kHz remain prominent, but the rest of the spectrum is present as well, giving the region 2020 of the composite presentation a more natural sound. The third stage 2215 of FIG. 22 illustrates the spectrogram of region 2020 after the insertion of background audio generated from the captured audio of region 2015. As shown, the drone of the crickets at 3 kHz and the other general noise is now present in the resultant spectrum, along with the harmonics of the human speech.

IV. Software Architecture

Figure 23:
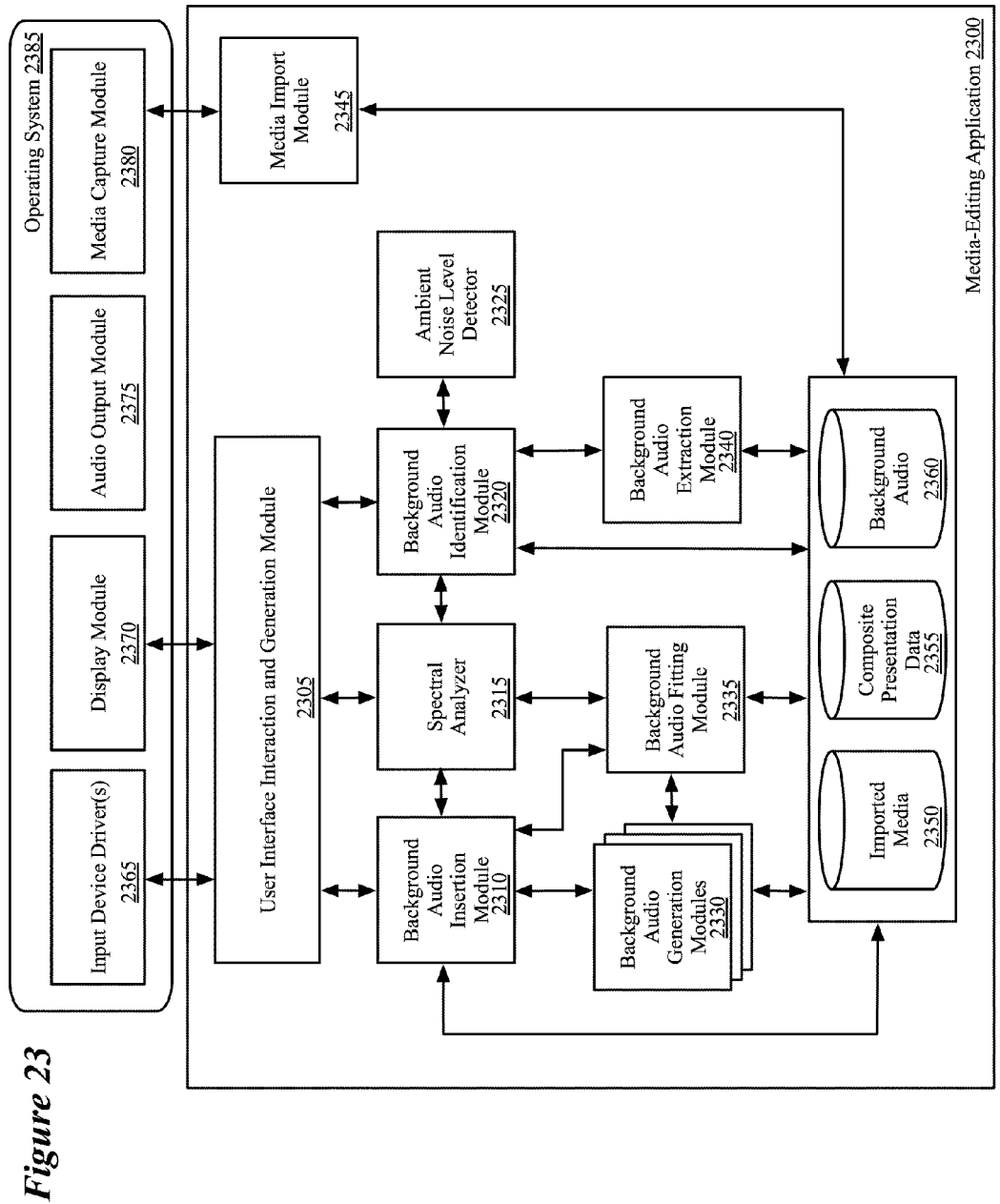
FIG. 23 conceptually illustrates the software architecture of a media-editing application of some embodiments.

In some embodiments, the processes described above are implemented as software running on a particular machine, such as a computer or a handheld device, or stored in a machine readable medium. FIG. 23 conceptually illustrates the software architecture of a media-editing application 2300 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media-editing application 2300 includes a user interface (UI) interaction and generation module 2305, a background audio insertion module 2310, a spectral analyzer 2315, a background audio identification module 2320, an ambient noise level detector 2325, background audio generation modules 2330, background audio fitting module 2335, background audio extraction module 2340, and a media import module 2345. The media-editing application also includes imported media 2350, composite presentation data 2355, and background audio 2360.

In some embodiments, the imported media 2350 stores the various different media data (e.g., video data, audio data, image data, etc.) that a user may use in creating a composite presentation. This includes audio files (e.g., .wav files, .mp3 files, etc.) and movie files containing audio (e.g., .mov files, etc.) that can be used to make up the audio of a composite presentation. The composite presentation data 2355 includes data defining a composite presentation. This data may include definitions of clips: e.g., references to source media files, in and out points in the source media files, data about edits to the clip, etc.).

The background audio 2360 includes audio data identified as background audio from a portion of a composite presentation, as well as background audio data created from the identified audio data (i.e., the data stored in storages 820 and 825 of FIG. 8). In some embodiments, the data 2350, 2355, and 2360 are all stored in one physical storage. In other embodiments, the various data are stored in separate physical storages, or two of the sets of data are stored in one physical storage while the third is in a different physical storage (e.g., the background audio data 2360 might include references to portions of the imported media 2350 and be stored along with the composite presentation data 2355, while the actual media is stored in a separate storage). In addition, one or more of the sets of data might be spread across multiple physical storages (e.g., imported media 2350 stored on multiple disk drives including shared network drives).

FIG. 23 also illustrates an operating system 2385 that includes input device driver(s) 2365, display module 2370, audio output module 2375, and media capture module 2380. In some embodiments, as illustrated, the device drivers 2365, display module 2370, audio output module 2375, and media capture module 2380 are part of the operating system 2385 even when the media-editing application 2300 is an application separate from the operating system.

The input device drivers 2365 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 2305.

The present application describes a media-editing application that enables a user to create a composite presentation. In some embodiments, the user creates the composite presentation through a user interface that provides users with numerous ways to perform different sets of operations and functionalities. In some embodiments, these operations and functionalities are performed based on different commands that are received from users through different input devices (e.g., keyboard, trackpad, touchpad, mouse, touchscreen, etc.).

The display module 2370 translates the output of a user interface for a display device. That is, the display module 2370 receives signals (e.g., from the UI interaction and generation module 2305) describing what should be displayed and translates these signals into pixel information that is sent to the display device. The display device may be an LCD, plasma screen, CRT monitor, touchscreen, etc. The audio output module 2375 translates audio output for an audio device (e.g., one or more speakers). That is, the audio output module 2375 receives signals describing the audio to output and translates these signals into information to send to the speakers.

The media capture module 2380 receives media files (e.g., audio files, video files, etc.) from storage devices (e.g., external drives, recording devices, etc.) through one or more ports (e.g., a USB port, Firewire port, etc.) of the device on which the application 2300 operates and translates this media data for the media-editing application or stores the data directly onto a storage of the device.

The UI interaction module 2305 of media-editing application 2300 interprets the user input data received from the input device drivers and passes it to various modules, including the background audio insertion module 2310, the spectral analyzer 2315, and the background audio identification module 2320. In some embodiments, the input data directly affects the composite presentation data or other data stored in the storages 2350-2360. For instance, when a user modifies the composite presentation (e.g., which pieces of media data make up the composite presentation), this is directly modified in the composite presentation data 2355 in some embodiments, or modified by additional modules not shown in this figure (e.g., editing modules).

The UI interaction module 2305 also manages the display of the UI, and outputs this display information to the display module 2370. This UI display information may be based on information from the various modules, including the spectral analyzer 2315 and the background audio insertion module 2310, or directly from input data (e.g., when a user moves an item in the UI that does not affect any of the other modules of the media-editing application 2300). For instance, the various waveforms and spectral graphs illustrated in the figures of this application may be displayed in the UI of some embodiments.

The media import module 2345 imports media into the media-editing application for use in creating a composite presentation. Some embodiments, as shown, receive data directly from the media capture module 2380 of the system on which the application 2300 operates. Some embodiments import media from a storage (e.g., a local hard disk, a network drive, etc.). Upon importing the media, the media import module 2345 generates data for the media-editing application about the media. For instance, when importing an audio file, some embodiments generate an audio clip data structure that refers to the file and stores additional information (e.g., metadata) about the file. The clip data structure of some embodiments may also be used to store further information about the audio clip after the clip is inserted into a composite presentation, edited, analyzed, etc.

The background audio identification module 2320 identifies background audio segments in a composite presentation. The background audio ID module 2320 receives a portion of a composite presentation within which to identify background audio (e.g., from user input through the UI interaction module 2305). The module 2320 retrieves the appropriate audio from the storage 2350 and uses the ambient noise level detector 2325 and spectral analyzer 2315 to identify the background audio segments in the received portion. The background audio ID module 2320 then passes the information about these segments to the background audio extraction module 2340.

The ambient noise level detector 2325 detects an ambient noise level in a portion of a composite presentation. The background audio ID module 2320 sends audio information to the ambient noise level detector 2325, which identifies the ambient noise level for the audio portion. Some embodiments perform the ambient noise level detection as described above in Section I. The detected ambient noise level is sent back to the background audio ID module 2320, and may also be stored in some embodiments for later use in identifying regions of the composite presentation in which to insert background audio (e.g., as part of the composite presentation data 2355).

The spectral analyzer 2315 of some embodiments performs spectral analysis on a portion of audio of a composite presentation to identify the audio frequencies present in the portion. Some embodiments use a Fast Fourier Transform technique in order to identify these frequencies from the audio waveform data. In some embodiments, the background audio identification module 2320 sends potential background audio to the spectral analyzer 2315, and then uses the results to determine whether the potential background audio contains non-background audio. For instance, as described above in Section I, the low-volume tail-end of non-background audio as well as other low-volume non-background audio may be identified using the frequency spectrum of the audio and eliminated from the background audio segments. The background audio extraction module 2340 receives information indicating the location within a composite presentation at which background audio has been found by the background audio identification module 2320. The background audio extraction module 2340 retrieves the appropriate audio source files from the media 2350 and extracts the identified background audio segments. The extraction module 2340 then stores these extracted segments in the background audio storage 2360 (e.g., RAM, permanent storage, etc.).

The background audio generation modules 2330 generate additional background audio for a composite presentation from a set of background audio segments extracted from the composite presentation. The background audio generation modules 2330 retrieve background audio segments from the storage 2360 and perform various audio processing techniques (e.g., concatenation, crossfading, overlap, frequency spectrum and phase matching and modification, gain matching and modification, etc.) on the retrieved background audio segments in order to generate additional background audio segments. The processes performed by the background audio generation modules 2330 of some embodiments are described in detail in Section II. In this example, the background audio generation modules 2330 may include the process selection module 805, audio generation modules 810, and segment matching modules 815.

The background audio insertion module 2310 inserts background audio segments into a composite presentation. The background audio insertion module 2310 receives a portion of a composite presentation (e.g., from user input through the UI interaction module 2305) and identifies regions within the portion in which to insert background audio. As described in Section III, these may be regions that lack sound completely, regions that fall below the ambient noise level, and/or regions that have non-background audio but lack background audio. The background audio insertion module 2310 uses the spectral analyzer 2315 to identify the regions with only non-background audio in some embodiments. After identifying the regions, the insertion module 2310 uses the background audio fitting module 2335 to create an audio segment tailored specifically to each such region, and inserts the audio segments into the composite presentation (e.g., as new audio clips).

The background audio fitting module 2335, as mentioned, tailors a background audio segment generated by modules 2330 for a particular region of a composite presentation identified by insertion module 2310. This may involve truncating a segment or concatenating segments to arrive at a segment with the required duration. In addition, the audio fitting may involve adjustment of gain levels, crossfading, etc., though in some embodiments these additional audio fitting procedures may be stored as composite presentation data that are accounted for when the media-editing application renders the composite presentation. Once the audio fitting module 2335 has created the background segment for a particular region, the insertion module 2310 can insert that segment into the particular region of the composite presentation.

While many of the features have been described as being performed by one module (e.g., the background audio insertion module 2310, the background audio identification module 2320, etc.), one of ordinary skill in the art will recognize that the functions described herein might be split up into multiple modules. Similarly, functions described as being performed by multiple different modules might be performed by a single module in some embodiments (e.g., the ambient noise level detector 2325 and the background audio extraction module 2340 could be part of background audio identification module 2320).

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
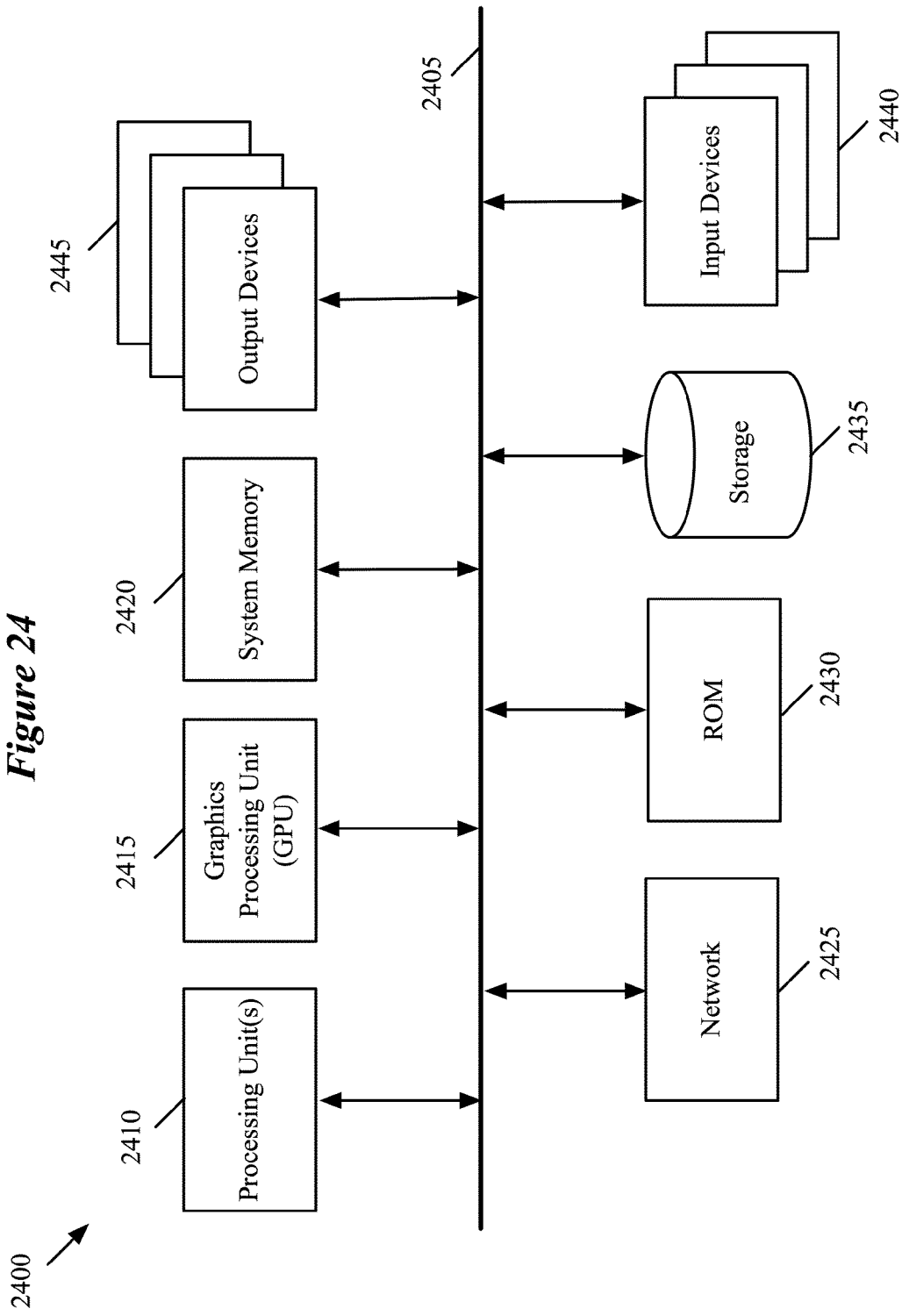
FIG. 24 conceptually illustrates a computer system with which some embodiments of the invention are implemented.

FIG. 24 conceptually illustrates an electronic system 2400 with which some embodiments of the invention are implemented. The electronic system 2400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, or ZIP® disk, and its corresponding disk drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"). The output devices 2445 display images generated by the electronic system. The output devices 2445 include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 3, 14, 15 and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A computer-implemented method comprising:
identifying a set of background audio segments of a composite presentation, wherein the set of background audio segments comprises a background audio segment having an audio level threshold greater than a noise level threshold, wherein identifying the set of background audio segments comprises:
   detecting an ambient noise level of a particular portion of the composite presentation;
   identifying regions within the particular portion that have audio within a threshold of the ambient noise level, wherein the identified regions have at least an automatically determined minimum threshold duration;
   extracting audio of the identified regions for inclusion in the set of background audio segments;
   performing a signal analysis on an identified region to identify a sub-region that includes background audio, wherein the identifying comprises determining that the sub-region lacks harmonics and includes random noise; and
   including the identified region in the set of background audio segments when the background audio level is greater than the ambient noise level;
generating additional background audio segments based on a plurality of the identified background audio segments;
detecting regions of the composite presentation that lack background audio, wherein detecting regions that lack background audio comprises detecting that a region has at least a threshold minimum duration having a noise level for the region that is less than or equal to the noise level threshold; and
inserting generated background audio into the detected regions of the composite presentation.

2. The method of claim 1, wherein the generating additional background audio segments comprises:
selecting a first and a second background audio segment from the set of background audio segments, wherein the first and second audio segments are different segments from the set of background audio segments; and
concatenating the first and second audio segments to form generated background audio.

3. The method of claim 2, further comprising flipping the second background audio segment before concatenation, wherein flipping comprises organizing the second background audio segment in a reverse playback order.

4. The method of claim 1, wherein the set of background audio segments is identified from a particular portion of the composite presentation that is less than the whole of the presentation and the identification of background audio is based on an ambient noise level of the particular portion.

5. The method of claim 1, wherein identifying the set of background audio segments further comprises:
performing spectral analysis on a particular region to identify a sub-region that includes non-background audio; and
removing the identified sub-region from the particular region before extracting the audio of the particular region as a background audio segment in the set of background audio segments.

6. The method of claim 1, wherein identifying the background audio further comprises:
performing spectral analysis on an identified region to identify a sub-region that includes non-background audio;
removing the identified sub-region that includes the non-background audio from the identified region, forming a modified identified region; and
including the modified identified region in the set of background audio segments, if the duration of the modified identified region is greater than the minimum threshold duration, otherwise removing the modified identified region from the identified regions such that the audio of the identified region is not extracted as a background audio segment.

7. A non-transitory computer readable medium storing a computer program which when executed by at least one processor inserts background audio into a composite presentation that comprises a plurality of media clips, the computer program comprising sets of instructions for:
identifying a plurality of background audio segments from a particular portion of the composite presentation, wherein the plurality of background audio segments comprises a background audio segment having an audio level threshold greater than a noise level threshold, wherein identifying the set of background audio segments comprises:
   detecting an ambient noise level of a particular portion of the composite presentation;
   identifying regions within the particular portion that have audio within a threshold of the ambient noise level, wherein the identified regions have at least an automatically determined minimum threshold duration;
   extracting audio of the identified regions for inclusion in the set of background audio segments;
   performing a signal analysis on an identified region to identify a sub-region that includes background audio, wherein the identifying comprises determining that the sub-region lacks harmonics and includes random noise; and
   including the identified region in the set of background audio segments when the background audio level is greater than the ambient noise level;
generating a set of segments by applying a plurality of audio processing operations to the identified plurality of background audio segments; and
inserting a subset of the generated segments into regions in the composite presentation that lack background audio.

8. The computer readable medium of claim 7, wherein the plurality of audio processing operations comprises a concatenation operation that concatenates two of the identified plurality of background audio segments.

9. The computer readable medium of claim 7, wherein the plurality of audio processing operations comprises an overlap operation that overlaps two of the identified plurality of background audio segments.

10. The computer readable medium of claim 7, wherein the plurality of audio processing operations comprises a crossfade operation that crossfades two concatenated background audio segments.

11. The computer readable medium of claim 7, wherein the plurality of audio processing operations are applied in a probabilistically selected manner.

12. The computer readable medium of claim 7, wherein the set of instructions for identifying the plurality of background audio segments comprises a set of instructions for automatically identifying the segments.

13. The computer readable medium of claim 7, wherein the set of instructions for generating the set of segments comprises a set of instructions for performing a plurality of segment matching techniques on the plurality of background audio segments in order to identify segments that share a threshold similarity in at least one characteristic.

14. The computer readable medium of claim 13, wherein the shared characteristic is at least one of frequency spectrum, phase, and gain level.

15. A non-transitory computer readable medium storing executable instructions which when executed by a data processing system causes the data processing system to perform a method comprising:

identifying a set of background audio segments of a composite presentation, wherein the set of background audio segments comprises a background audio segment having an audio level threshold greater than a noise level threshold, wherein identifying the set of background audio segments comprises:

detecting an ambient noise level of a particular portion of the composite presentation;

identifying regions within the particular portion that have audio within a threshold of the ambient noise level, wherein the identified regions have at least an automatically determined minimum threshold duration;

extracting audio of the identified regions for inclusion in the set of background audio segments;

performing a signal analysis on an identified region to identify a sub-region that includes background audio, wherein the identifying comprises determining that the identified sub-region lacks harmonics and includes random noise; and including the identified region in the set of background audio segments when the background audio level is greater than the ambient noise level;

generating additional background audio segments based on a plurality of the identified background audio segments;

detecting regions of the composite presentation that lack background audio, wherein detecting regions that lack background audio comprises detecting that a region has at least a threshold minimum duration having a noise level for the region that is less than or equal to the noise level threshold; and inserting generated background audio into the detected regions of the composite presentation.

16. The medium of claim 15, wherein the generating additional background audio segments comprises:

selecting a first and a second background audio segment from the set of background audio segments, wherein the first and second audio segment are different segments from the set of background audio segments; and concatenating the first and second audio segments to form generated background audio.

17. The medium of claim 16, further comprising flipping the second background audio segment before concatenation, wherein flipping comprises organizing the second background audio segment in a reverse playback order.

18. The medium of claim 15, wherein the set of background audio segments is identified from a particular portion of the composite presentation that is less than the whole of the composite presentation and the identification of background audio is based on an ambient noise level of the particular portion.

19. The medium of claim 15, wherein identifying the set of background audio segments further comprises:

performing spectral analysis on a particular region to identify a sub-region that includes non-background audio; and removing the identified sub-region from the particular region before extracting the audio of the particular region as a background audio segment in the set of background audio segments.

20. The medium of claim 15, wherein identifying the background audio further comprises:

performing spectral analysis on an identified region to identify a sub-region that includes non-background audio;

removing the identified sub-region that includes non-background audio from the identified region, forming a modified identified region; and including the modified identified region in the set of background audio segments, if the duration of the modified identified region is greater than the threshold duration, otherwise removing the modified identified region from the identified regions such that the audio of the identified region is not extracted as a background audio segment.

* * * * *